United States Patent
Iwai et al.

(10) Patent No.: US 10,823,277 B2
(45) Date of Patent: Nov. 3, 2020

(54) SLIDING COMPONENT AND BICYCLE COMPONENT

(71) Applicant: SHIMANO INC., Sakai (JP)

(72) Inventors: Tooru Iwai, Sakai (JP); Masanori Taniguchi, Sakai (JP)

(73) Assignee: SHIMANO INC., Sakai (JP)

( * ) Notice: Subject to any disclaimer, the term of this patent is extended or adjusted under 35 U.S.C. 154(b) by 364 days.

(21) Appl. No.: 15/645,999

(22) Filed: Jul. 10, 2017

(65) Prior Publication Data

US 2019/0011037 A1  Jan. 10, 2019

(51) Int. Cl.

| | | |
|---|---|---|
| *F16H 57/04* | (2010.01) | |
| *F16H 1/28* | (2006.01) | |
| *F16G 13/06* | (2006.01) | |
| *F16H 57/05* | (2006.01) | |
| *B62M 9/10* | (2006.01) | |
| *B62M 11/02* | (2006.01) | |
| *B62M 25/02* | (2006.01) | |
| *C10M 105/24* | (2006.01) | |
| *B62M 23/00* | (2006.01) | |
| *B62M 11/16* | (2006.01) | |
| *F16C 1/24* | (2006.01) | |
| *F16C 1/20* | (2006.01) | |
| *F16C 1/26* | (2006.01) | |
| *C10N 30/06* | (2006.01) | |

(Continued)

(52) U.S. Cl.
CPC .......... *F16H 57/0464* (2013.01); *B62M 9/10* (2013.01); *B62M 9/105* (2013.01); *B62M 11/02* (2013.01); *B62M 11/16* (2013.01); *B62M 23/00* (2013.01); *B62M 25/02* (2013.01); *C10M 105/24* (2013.01); *F16G 13/06* (2013.01); *F16H 1/28* (2013.01); *F16H 57/0479* (2013.01); *F16H 57/0486* (2013.01); *F16H 57/05* (2013.01); *C10M 2207/126* (2013.01); *C10N 2030/06* (2013.01); *C10N 2040/04* (2013.01); *C10N 2050/025* (2020.05); *F16C 1/205* (2013.01); *F16C 1/24* (2013.01); *F16C 1/267* (2013.01)

(58) Field of Classification Search
CPC .. F16H 57/0464; F16H 57/05; F16H 57/0479; F16H 57/0486; F16H 1/28; C10M 105/24; C10M 2207/126; F16G 13/06; F16C 1/267; F16C 1/205; F16C 1/24; C10N 2250/141; C10N 2230/06; C10N 2240/04; B62M 23/00; B62M 11/16; B62M 9/105; B62M 25/02; B62M 11/02; B62M 9/10
See application file for complete search history.

(56) References Cited

U.S. PATENT DOCUMENTS 5,898,022 A * 4/1999 Maples ................ C10M 111/02
508/113
2005/0252750 A1* 11/2005 Matsueda .............. B62M 11/16
192/217.4

(Continued)

FOREIGN PATENT DOCUMENTS

| CN | 202451702 U | 9/2012 |
|---|---|---|
| JP | 3431028 B2 | 3/1994 |

*Primary Examiner* — Taiwo Oladapo
(74) *Attorney, Agent, or Firm* — Mori & Ward, LLP

(57) ABSTRACT

A sliding component comprises a base member, a plated layer, and a lubricant agent. The plated layer includes a metallic material and is disposed on the base member. The lubricant agent includes a fatty acid containing a carboxyl group. The lubricant agent contacts the plated layer.

19 Claims, 30 Drawing Sheets

(51) Int. Cl.
  *C10N 40/04* (2006.01)
  *C10N 50/00* (2006.01)

(56) References Cited

U.S. PATENT DOCUMENTS

2006/0217224 A1   9/2006   Girg et al.
2009/0258742 A1*  10/2009  Valle .................. B21L 9/065
                                                474/228

* cited by examiner

SLIDING COMPONENT AND BICYCLE COMPONENT

BACKGROUND OF THE INVENTION

Field of the Invention

The present invention relates to a sliding component and a bicycle component.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sliding component.

SUMMARY OF THE INVENTION

In accordance with a first aspect of the present invention, a sliding component comprises a base member, a plated layer, and a lubricant agent. The plated layer includes a metallic material. The plated layer is disposed on the base member. The lubricant agent includes a fatty acid containing a carboxyl group. The lubricant agent contacts the plated layer.

With the sliding component according to the first aspect, the carboxyl group in the lubricant agent facilitates formation of an oil film on the plated layer. The oil film is resistant to breakage.

In accordance with a second aspect of the present invention, the sliding component according to the first aspect is configured so that the fatty acid includes an olein acid.

With the sliding component according to the second aspect, the olein acid further facilitates adhesion of the lubricant agent to the metallic material of the plated layer.

In accordance with a third aspect of the present invention, the sliding component according to the first aspect is configured so that the fatty acid includes a stearic acid.

With the sliding component according to the third aspect, the stearic acid further facilitates adhesion of the lubricant agent to the metallic material of the plated layer.

In accordance with a fourth aspect of the present invention, the sliding component according to the first aspect is configured so that the fatty acid includes a linoleic acid.

With the sliding component according to the fourth aspect, the linoleic acid further facilitates adhesion of the lubricant agent to the metallic material of the plated layer.

In accordance with a fifth aspect of the present invention, the sliding component according to any one of the first to fourth aspects is configured so that the plated layer has Vickers hardness ranging from 10 HV to 200 HV.

With the sliding component according to the fifth aspect, an outer surface of the plated layer is plastically deformed to become smoother when the plated layer slides on another material. Therefore, it becomes less possible for the plated layer to directly contact the other material.

In accordance with a sixth aspect of the present invention, the sliding component according to any one of the first to fifth aspects is configured so that the plated layer includes tin.

With the sliding component according to the sixth aspect, the lubricant agent further facilitates adhesion of the lubricant agent to the tin of the plated layer, and the carboxyl group facilitates formation of an oil film on the plated layer.

In accordance with a seventh aspect of the present invention, the sliding component according to the sixth aspect further comprises a chromized layer to slidably contact the plated layer.

With the sliding component according to the seventh aspect, a friction coefficient between the plated layer and the chromized layer is relatively low. Further, a mutual solubility coefficient between tin and chrome via the lubricant agent is relatively low. Accordingly, even if the oil film is broken, the chromized layer and the plated layer are not agglutinated. In addition, the outer surface of the plated layer is plastically deformed to become smoother when the plated layer slides on the chromized layer. Therefore, it becomes less possible for the plated layer to directly contact the chromized layer.

In accordance with an eighth aspect of the present invention, the sliding component according to any one of the first to fifth aspects is configured so that the plated layer includes silver.

With the sliding component according to the eighth aspect, the lubricant agent further facilitates adhesion of the lubricant agent to the silver of the plated layer, and the carboxyl group facilitates formation of an oil film on the plated layer.

In accordance with a ninth aspect of the present invention, the sliding component according to the eighth aspect further comprises a chromized layer to slidably contact the plated layer.

With the sliding component according to the ninth aspect, a friction coefficient between the plated layer and the chromized layer is relatively low. Further, a mutual solubility coefficient between silver and chrome via the lubricant agent is relatively low. Accordingly, even if the oil film is broken, the chromized layer and the plated layer are not agglutinated. In addition, an outer surface of the plated layer is plastically deformed to become smoother when the plated layer slides on the chromized layer. Therefore, it becomes less possible for the plated layer to directly contact the chromized layer.

In accordance with a tenth aspect of the present invention, the sliding component according to any one of the first to ninth aspects further comprises a bicycle chain including the base member and the plated layer.

With the sliding component according to the tenth aspect, the sliding component enhances durability of the bicycle chain and decreases power loss of the bicycle chain.

In accordance with an eleventh aspect of the present invention, the sliding component according to the tenth aspect is configured so that the bicycle chain includes an inner link plate and an outer link plate. The at least one of the inner link plate and the outer link plate includes the base member and the plated layer.

With the sliding component according to the eleventh aspect, the sliding component further enhances durability of the bicycle chain and further decreases power loss of the bicycle chain, because the at least one of the inner link plate and the outer link plate frequently slides on the pin.

In accordance with a twelfth aspect of the present invention, the sliding component according to any one of the tenth and eleventh aspects is configured so that the bicycle chain includes a pin which is chromized.

With the sliding component according to the twelfth aspect, the sliding component further enhances durability of the bicycle chain and further decreases power loss of the bicycle chain, because the chromized pin plastically deforms the outer surface of the plated layer to become smoother. Accordingly, it becomes less possible for the plated layer to directly contact the chromized layer.

In accordance with a thirteenth aspect of the present invention, the sliding component according to any one of the eleventh and twelfth aspects is configured so that the inner link plate includes the base member and the plated layer. The pin is configured to slidably contact the inner link plate.

With the sliding component according to the thirteenth aspect, the sliding component further enhances durability of the bicycle chain and further decreases power loss of the bicycle chain, because the inner link plate has a wider surface that contacts the pin than that of the outer link plate.

In accordance with a fourteenth aspect of the present invention, the sliding component according to any one of the first to ninth aspects further comprises a Bowden cable including the base member and the plated layer.

With the sliding component according to the fourteenth aspect, the sliding component enhances durability and sliding performance of the Bowden cable.

In accordance with a fifteenth aspect of the present invention, the sliding component according to the fourteenth aspect is configured so that the Bowden cable includes an inner wire and an outer casing. The inner wire includes the base member and the plated layer.

With the sliding component according to the fifteenth aspect, the sliding component further enhances durability and sliding performance of the Bowden cable, because the inner wire frequently slides on the outer casing.

In accordance with a sixteenth aspect of the present invention, the sliding component according to any one of the first to ninth aspects further comprises a gear including the base member and the plated layer.

With the sliding component according to the sixteenth aspect, the sliding component further enhances durability of the gear and decreases power loss of the gear, because the gear frequently slides on another gear.

In accordance with a seventeenth aspect of the present invention, the sliding component according to the sixteenth aspect is configured so that the gear is a part of a bicycle drive train.

With the sliding component according to the fifteenth aspect, the sliding component further enhances durability of the gear and further decreases power loss of the gear, because the gear of the bicycle drive train frequently slides on another gear of the bicycle drive train.

In accordance with an eighteenth aspect of the present invention, a bicycle internal transmission device comprises a housing and the sliding component according to any one of the first to ninth aspects. The sliding component is disposed in the housing.

With the sliding component according to the eighteenth aspect, it is possible to keep the lubricant agent in the housing to maintain quality and quantity of the lubricant agent in the sliding component.

In accordance with a nineteenth aspect of the present invention, the bicycle internal transmission device according to the eighteenth aspect further comprises a planetary gear mechanism including at least one planetary gear, at least one sun gear and at least one ring gear. At least one of the at least one planetary gear, the at least one sun gear, and the at least one ring gear includes the base member and the plated layer.

With the sliding component according to the nineteenth aspect, the sliding component enhances durability of the planetary gear mechanism and decreases power loss of the planetary gear mechanism, because the at least one planetary gear frequently slides on the at least one sun gear and the at least one ring gear.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
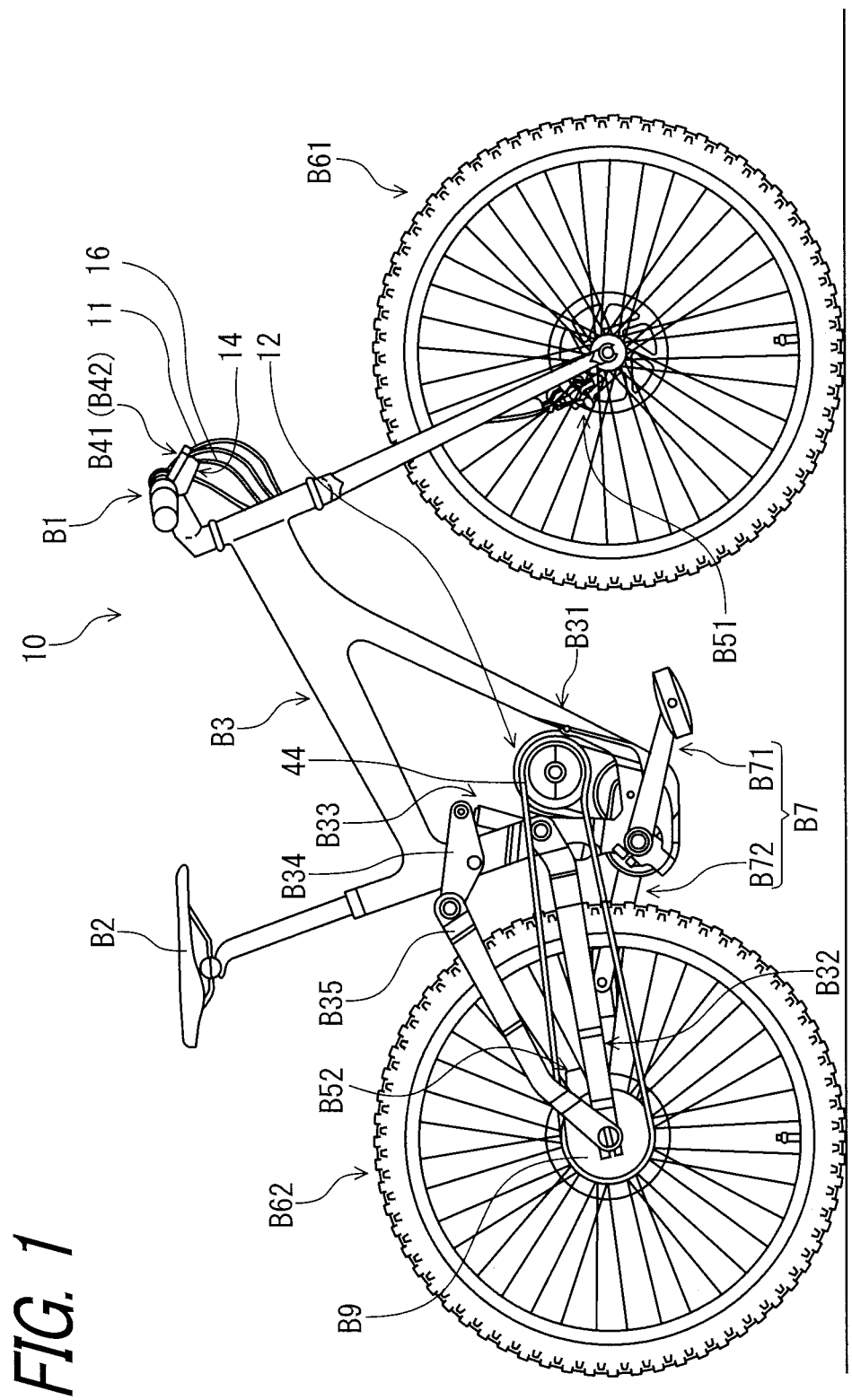
FIG. 1 is a side elevational view of a bicycle provided with a bicycle internal transmission device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 is illustrated that is equipped with a bicycle internal transmission device 12 in accordance with a first embodiment. While the bicycle 10 is illustrated as a mountain bike, the bicycle internal transmission device 12 can be applied to road bikes or any type of bicycle.

As seen in FIG. 1, the bicycle 10 includes a handlebar B1, a saddle B2, a bicycle frame B3, a front brake operating device B41, a rear brake operating device B42, a front braking device B51, a rear braking device B52, a front wheel B61, a rear wheel B62, and a bicycle crank B7. The front brake operating device B41 is operatively coupled to the front braking device B51 via an operation cable 11. The operation cable 11 is, for example, a Bowden cable. Accordingly, the operation cable 11 can be referred to as a Bowden cable 11. The rear brake operating device B42 is operatively coupled to the rear braking device B52 via the operation cable 11. The bicycle crank B7 includes crank arms B71 and B72 each coupled to the bicycle internal transmission device 12 to input a pedaling force into the bicycle internal transmission device 12.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle B2 of the bicycle 10 with facing the handlebar B1. Accordingly, these terms, as utilized to describe the bicycle internal transmission device 12, should be interpreted relative to the bicycle 10 equipped with the bicycle internal transmission device 12 as used in an upright riding position on a horizontal surface.

The bicycle 10 includes a shift operating device 14 via which bicycle internal transmission device 12 is operated by the user (e.g., the rider) for changing a speed stage of the bicycle internal transmission device 12. The shift operating device 14 is mounted to the handlebar B1 and is adjacent to the front brake operating device B41, for example. The shift operating device 14 can be integrated in at least one of the front brake operating device B41 and the rear brake operating device B42 if needed and/or desired.

The shift operating device 14 is operatively coupled to the bicycle internal transmission device 12. In the illustrated embodiment, the shift operating device 14 is electrically connected to the bicycle internal transmission device 12 via a control cable 16 which is an electrical control cable. While the bicycle internal transmission device 12 is electrically actuated in response to a shift operation of the shift operating device 14 in the illustrated embodiment, the shift operating device 14 can be mechanically coupled to the bicycle internal transmission device 12 via the control cable 16 which is, for example, a Bowden cable if needed and/or desired. Furthermore, the bicycle internal transmission device 12 and the shift operating device 14 can use a wireless technology if needed and/or desired.

As seen in FIG. 1, the bicycle internal transmission device 12 is mounted to the bicycle frame B3. The bicycle internal transmission device 12 is configured to transmit the pedaling force to the rear wheel B62 at a variable speed stage. The variable speed stage includes speed stages different from each other. The bicycle internal transmission device 12 can have at least two speed stages. Furthermore, the bicycle internal transmission device 12 can have a continuously variable speed stage if needed and/or desired.

Figure 2:
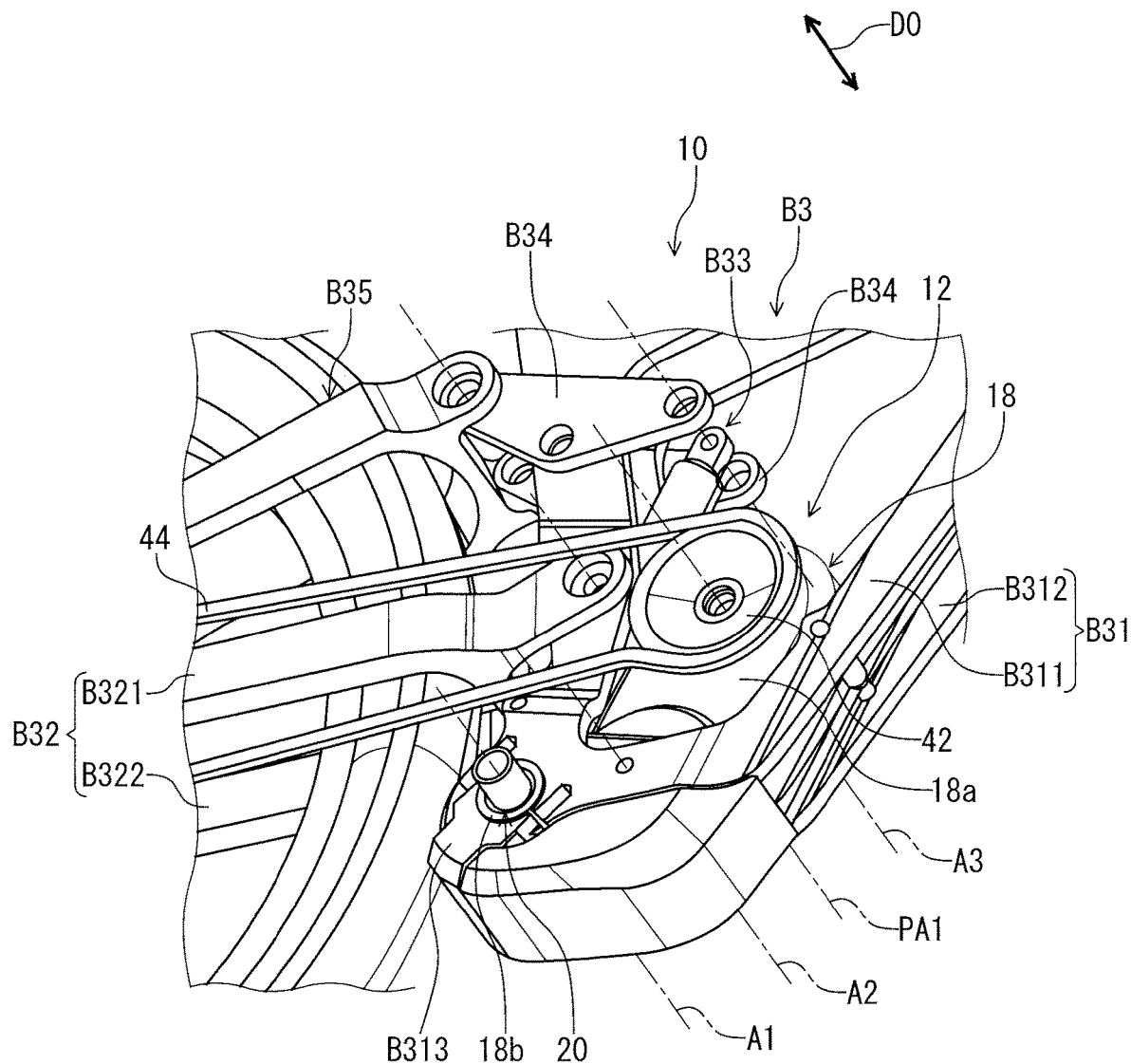
FIG. 2 is a perspective view of the bicycle internal transmission device mounted to a bicycle frame of the bicycle illustrated in FIG. 1.
Figure 3:
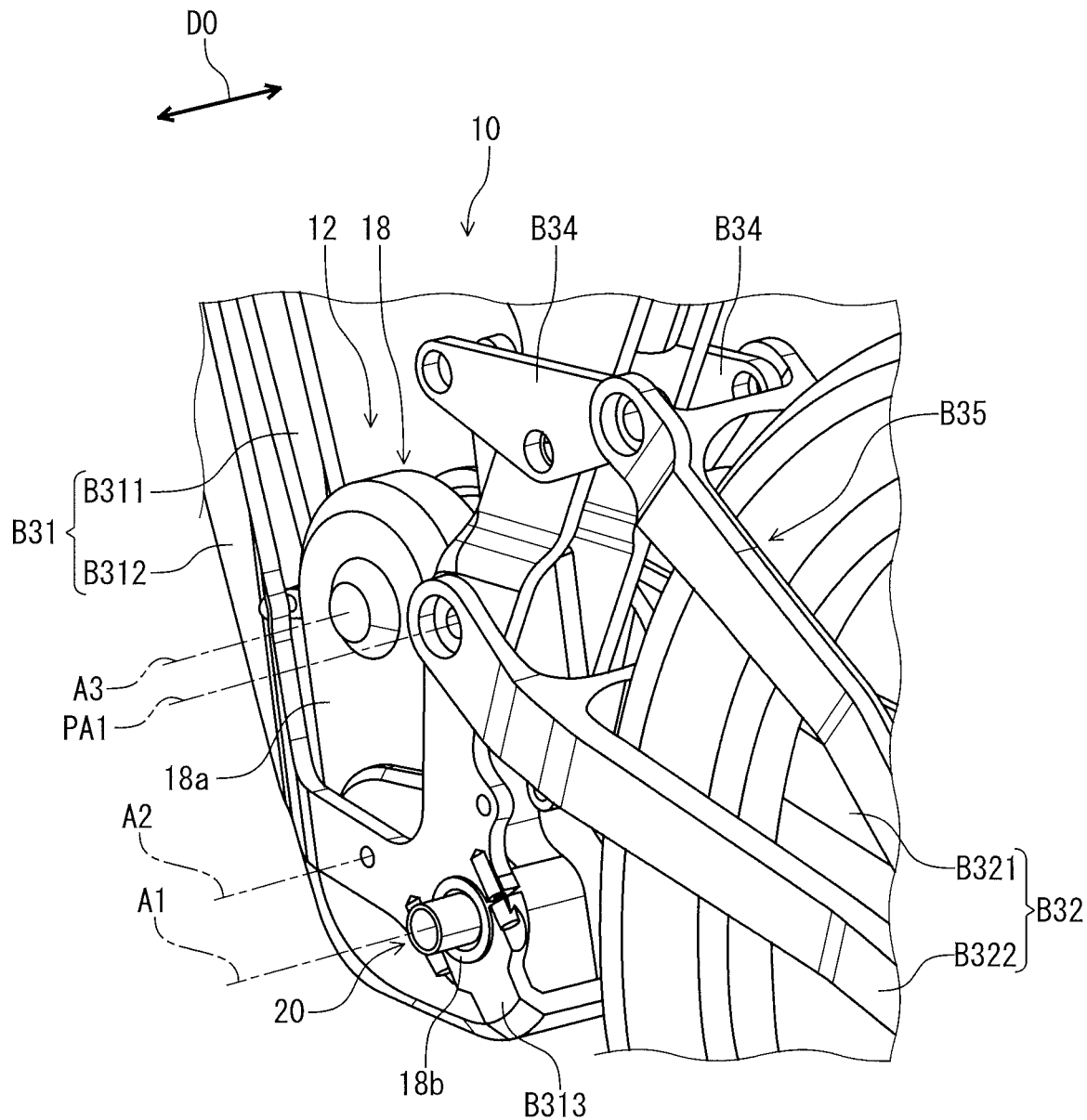
FIG. 3 is a perspective view of the bicycle internal transmission device mounted to the bicycle frame of the bicycle illustrated in FIG. 1.

As seen in FIGS. 2 and 3, the bicycle internal transmission device 12 comprises a housing (an outer member) 18. The housing 18 is mounted to the bicycle frame B3. In the illustrated embodiment, the housing 18 is configured to be attached to the bicycle frame B3 as a separate member from the bicycle frame B3. However, at least part of the housing 18 can be integrally provided with the bicycle frame B3 as a single unitary member if needed and/or desired.

In the illustrated embodiment, the bicycle frame B3 includes a first frame B31 and a second frame B32. The housing 18 is mounted to the first frame B31 as a separate member from the first frame B31. The second frame B32 is pivotably coupled to the first frame B31 about a pivot axis PA1. The first frame B31 includes first sub frames B311 and B312 spaced apart from each other in a transverse direction D0 of the bicycle 10. The pivot axis PA1 is substantially parallel to the transverse direction D0. The housing 18 is provided between the first sub frames B311 and B312.

The second frame B32 includes second sub frames B321 and B322 spaced apart from each other in the transverse direction D0. The second sub frame B321 is coupled to the second sub frame B322 as forming a one-piece member. The second sub frame B321 is pivotably coupled to the first sub frame B311 about the pivot axis PA1. The second sub frame B322 is pivotably coupled to the first sub frame B312 about the pivot axis PA1.

As seen in FIG. 1, the second frame B32 is coupled to a hub shaft of a hub assembly of the rear wheel B62. The bicycle frame B3 further includes a suspension device B33, a first link B34, and a second link B35. The first link B34 is pivotably coupled to the first frame B31. The second link B35 is rotatably coupled to the rear wheel B62 and one end of the first link B34. The second link B35 is rigidly coupled to the second sub frames B321 and B322. The second link B35 and the second sub frames B321 and B322 may be integrally provided as a single unitary member. The suspension device B33 is pivotably coupled to the first frame B31 and the other end of the first link B34 for absorbing shock applied to the bicycle frame B3.

Figure 4:
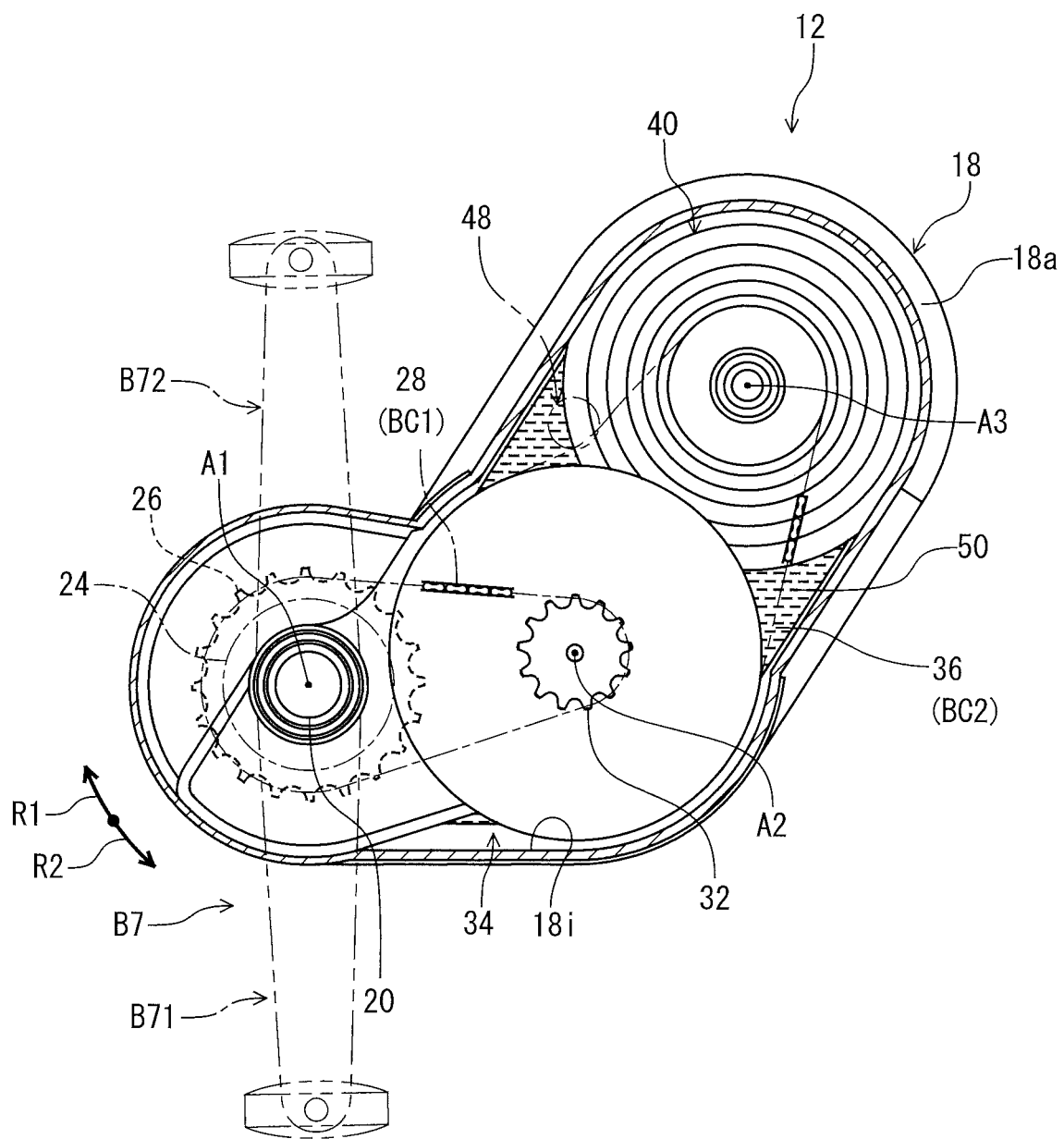
FIG. 4 is a cross-sectional view of the bicycle internal transmission device illustrated in FIG. 1.
Figure 5:
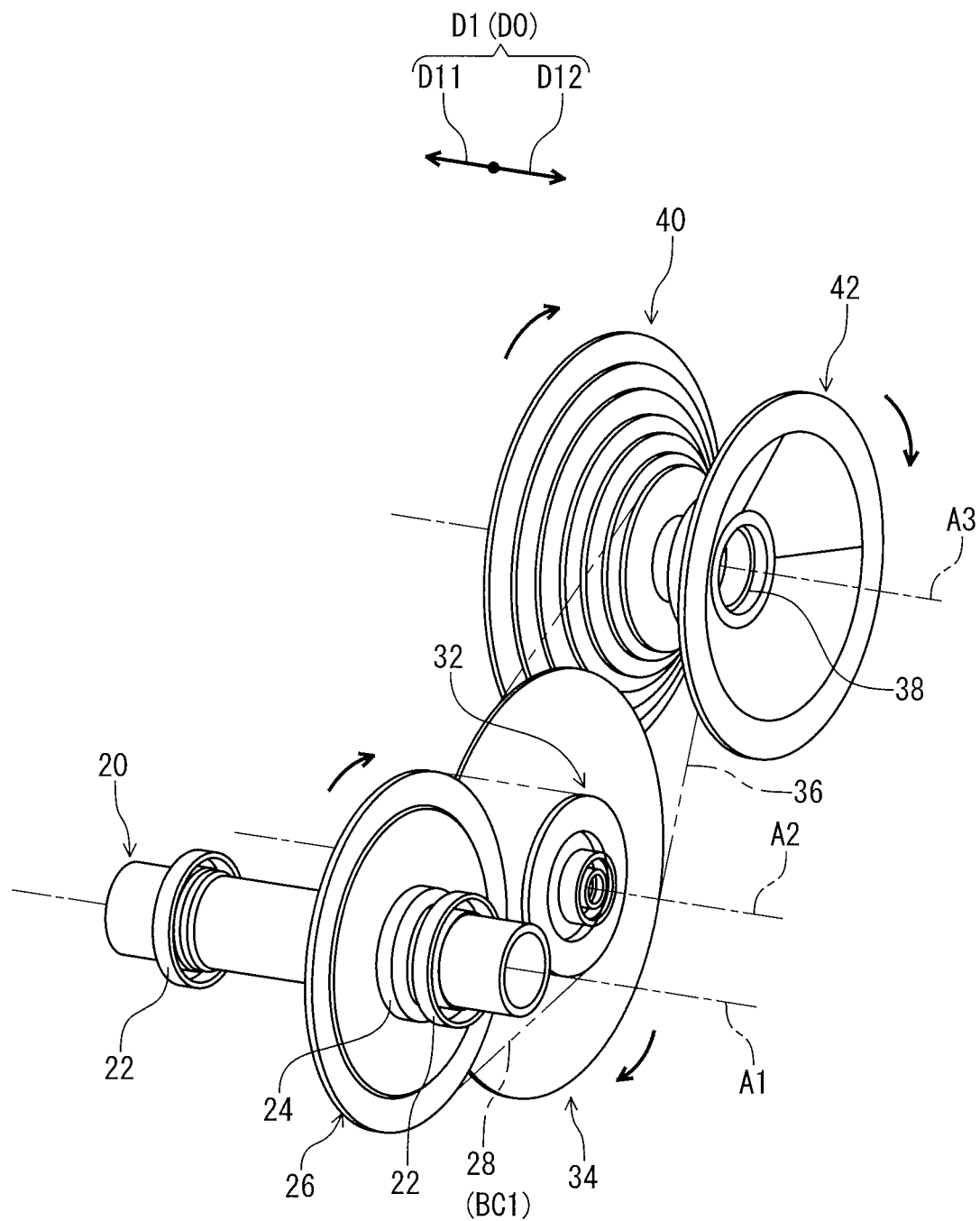
FIG. 5 is a perspective view of the bicycle internal transmission device illustrated in FIG. 1 without a housing.
Figure 6:
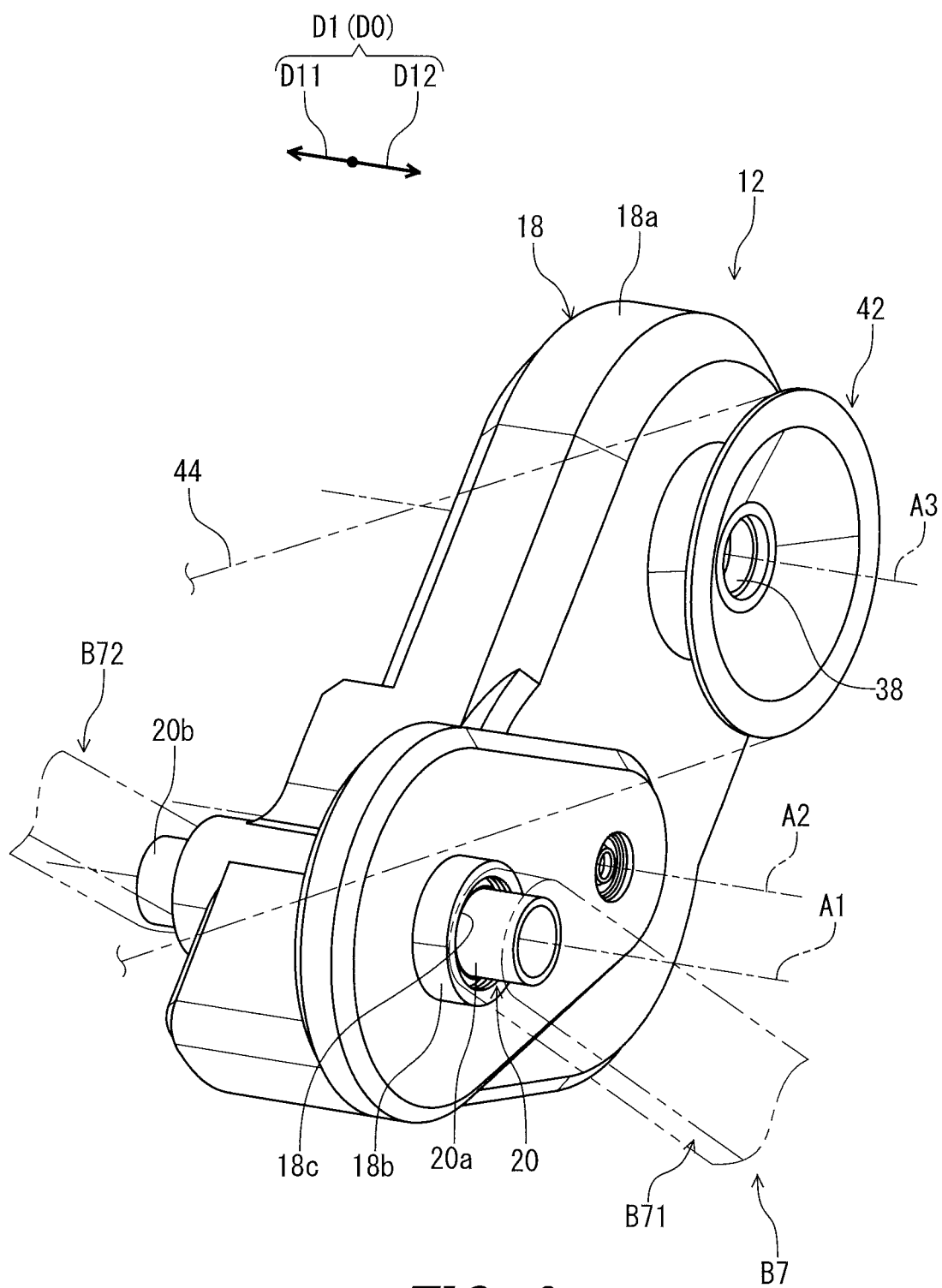
FIG. 6 is a perspective view of the bicycle internal transmission device illustrated in FIG. 1.

As seen in FIGS. 4 to 6, the bicycle internal transmission device 12 comprises an input shaft 20. The input shaft 20 is mounted to the housing 18 (FIG. 6) to receive an input torque. The input shaft 20 has an input rotational axis A1 which is substantially parallel to the transverse direction D0. The input shaft 20 is rotatable relative to the housing 18 (FIG. 6) about the input rotational axis A1 in response to the input torque. The input shaft 20 is rotatably mounted to the housing 18 (FIG. 6) via input bearing assemblies 22 (FIG. 5).

Figure 7:
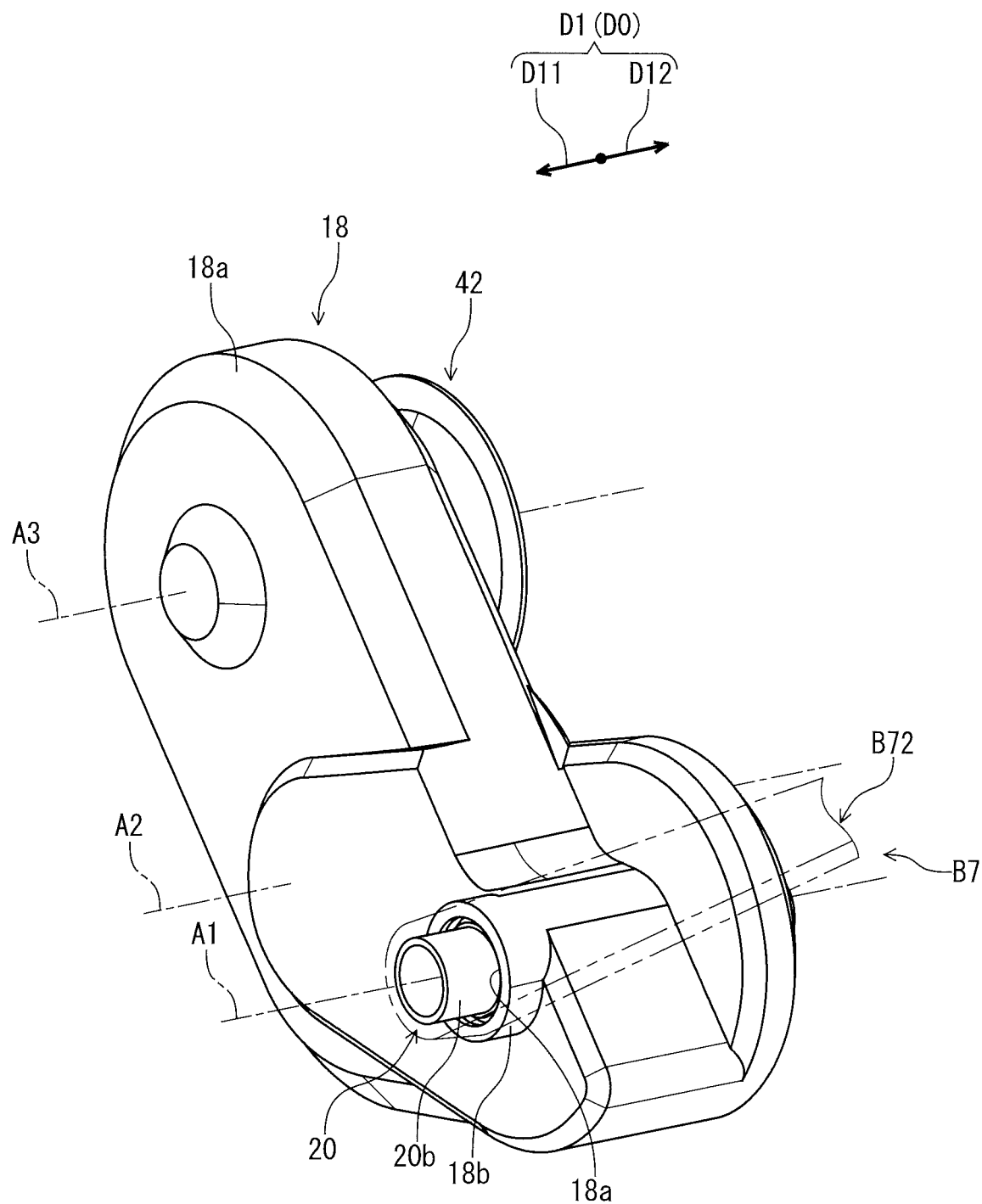
FIG. 7 is a perspective view of the bicycle internal transmission device illustrated in FIG. 1.

As seen in FIGS. 6 and 7, the input shaft 20 is configured to be coupled to a crank arm of the bicycle crank B7 as a crank axle of the bicycle crank B7. In the illustrated embodiment, the input shaft 20 is configured to be coupled to the crank arms B71 and B72 of the bicycle crank B7 as the crank axle of the bicycle crank B7. The input shaft 20 includes a first axle end 20a and a second axle end 20b opposite to the first axle end 20a in an axial direction D1 which is parallel to the input rotational axis A1. The first axle end 20a and the second axle end 20b are provided outside the housing 18. The crank arm B71 is coupled to the first axle end 20a. The crank arm B72 is coupled to the second axle end 20b.

Figure 8:
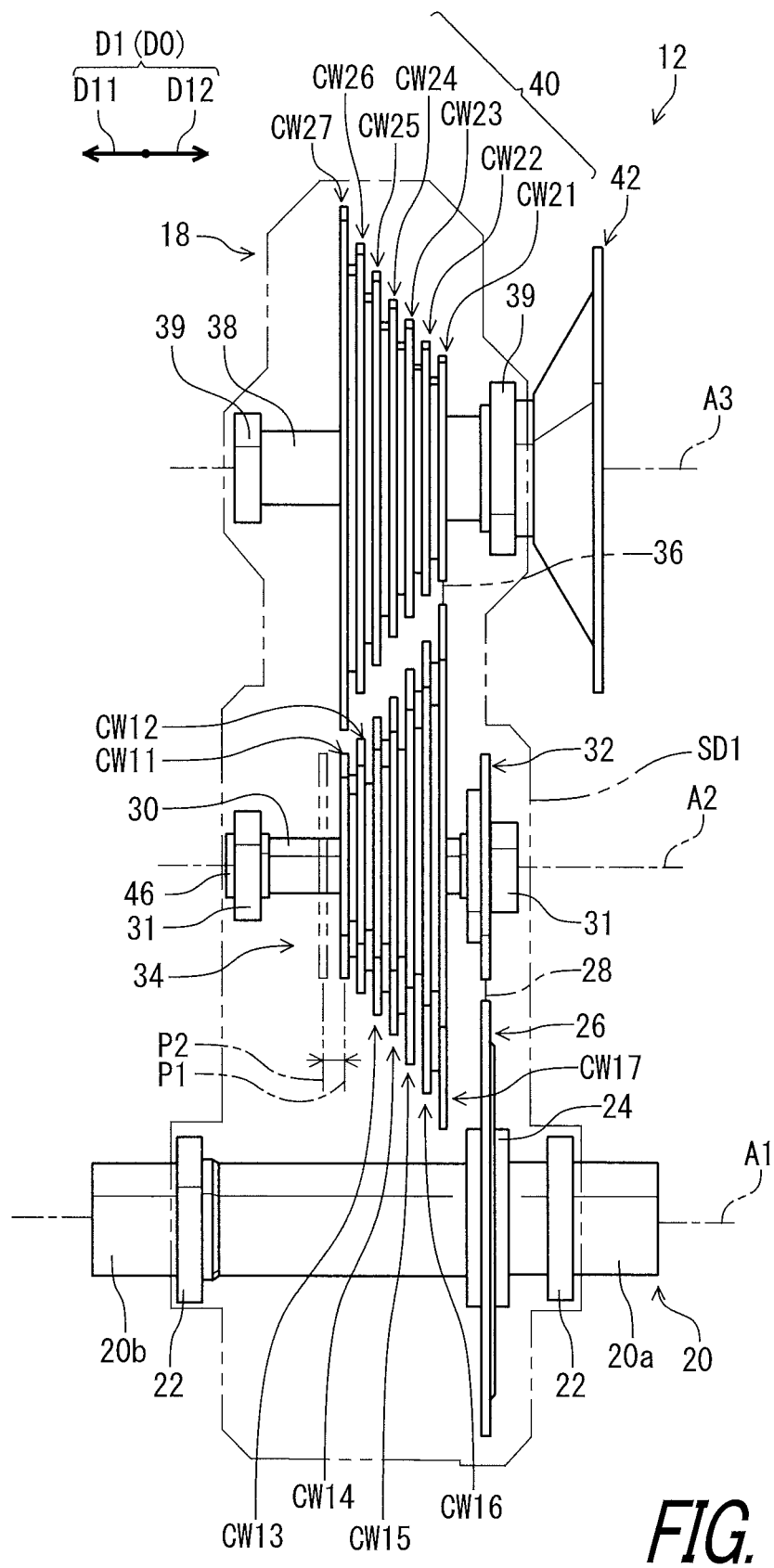
FIG. 8 is a plan view of the bicycle internal transmission device illustrated in FIG. 1 without the housing when viewed diagonally backward.

As seen in FIGS. 4 and 8, the bicycle internal transmission device 12 further comprises a one-way clutch 24 and an input cogwheel 26. The one-way clutch 24 is configured to couple the input cogwheel 26 to the input shaft 20 and is provided between the input shaft 20 and the input cogwheel 26. As seen in FIG. 4, the one-way clutch 24 is configured to transmit a first rotation R1 of the input shaft 20 to the input cogwheel 26 and is configured to prevent a second rotation R2 of the input shaft 20 from being transmitted from the input shaft 20 to the input cogwheel 26. The second rotation R2 is opposite to the first rotation R1 about the input rotational axis A1. The one-way clutch 24 can be omitted from the bicycle internal transmission device 12 if needed and/or desired.

As seen in FIGS. 4, 5, and 8, the bicycle internal transmission device 12 comprises an input coupling member 28, a first shaft 30, and an intermediate cogwheel 32. The first shaft 30 has a first rotational axis A2 which is preferably substantially parallel to the input rotational axis A1. As seen in FIG. 8, the first shaft 30 is rotatably mounted to the housing 18 about a first rotational axis A2 via first bearing assemblies 31. The intermediate cogwheel 32 is attached to the first shaft 30 to be rotatable relative to the housing 18 about the first rotational axis A2. The input coupling member 28 is configured to couple the input cogwheel 26 to the intermediate cogwheel 32 to transmit rotation of the input shaft 20 to the intermediate cogwheel 32. As seen in FIG. 4, the input coupling member 28 comprises a bicycle chain BC1 (partially illustrated), and each of the input cogwheel 26 and the intermediate cogwheel 32 comprises a sprocket including teeth. The input coupling member 28 is configured to engage with both the input cogwheel 26 and the intermediate cogwheel 32.

The bicycle internal transmission device 12 further comprises a first transmission member 34. The first transmission member 34 is attached to the first shaft 30 and configured to rotate together with the first shaft 30 relative to the housing 18. The first transmission member 34 is coupled to the intermediate cogwheel 32 to rotate together with the intermediate cogwheel 32 relative to the housing 18 about the first rotational axis A2. The first transmission member 34 includes a plurality of first cogwheels CW11 to CW17 arranged in the axial direction D1, which are described in detail below.

Figure 9:
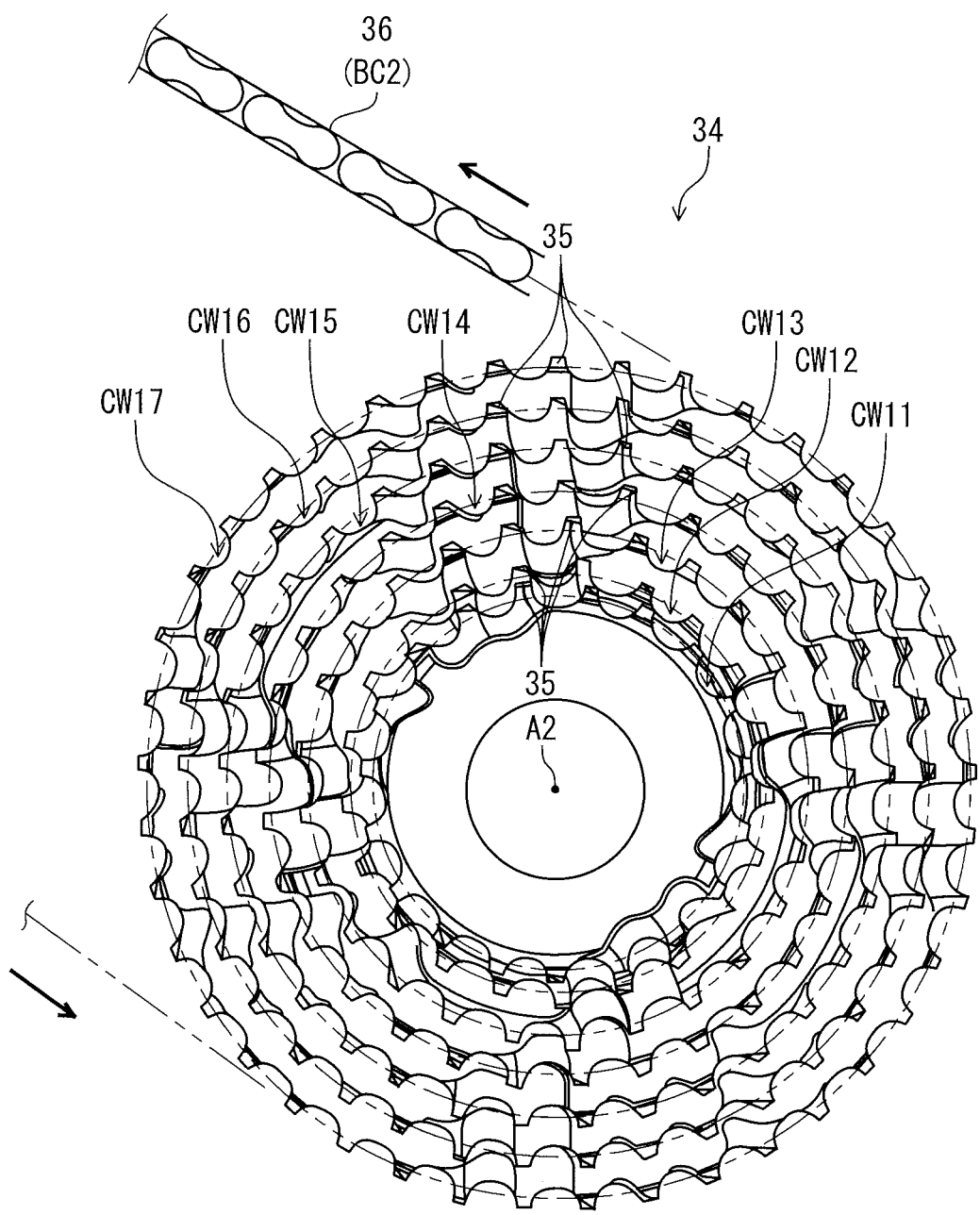
FIG. 9 is a side elevational view of a first transmission member of the bicycle internal transmission device illustrated in FIG. 1.
Figure 10:
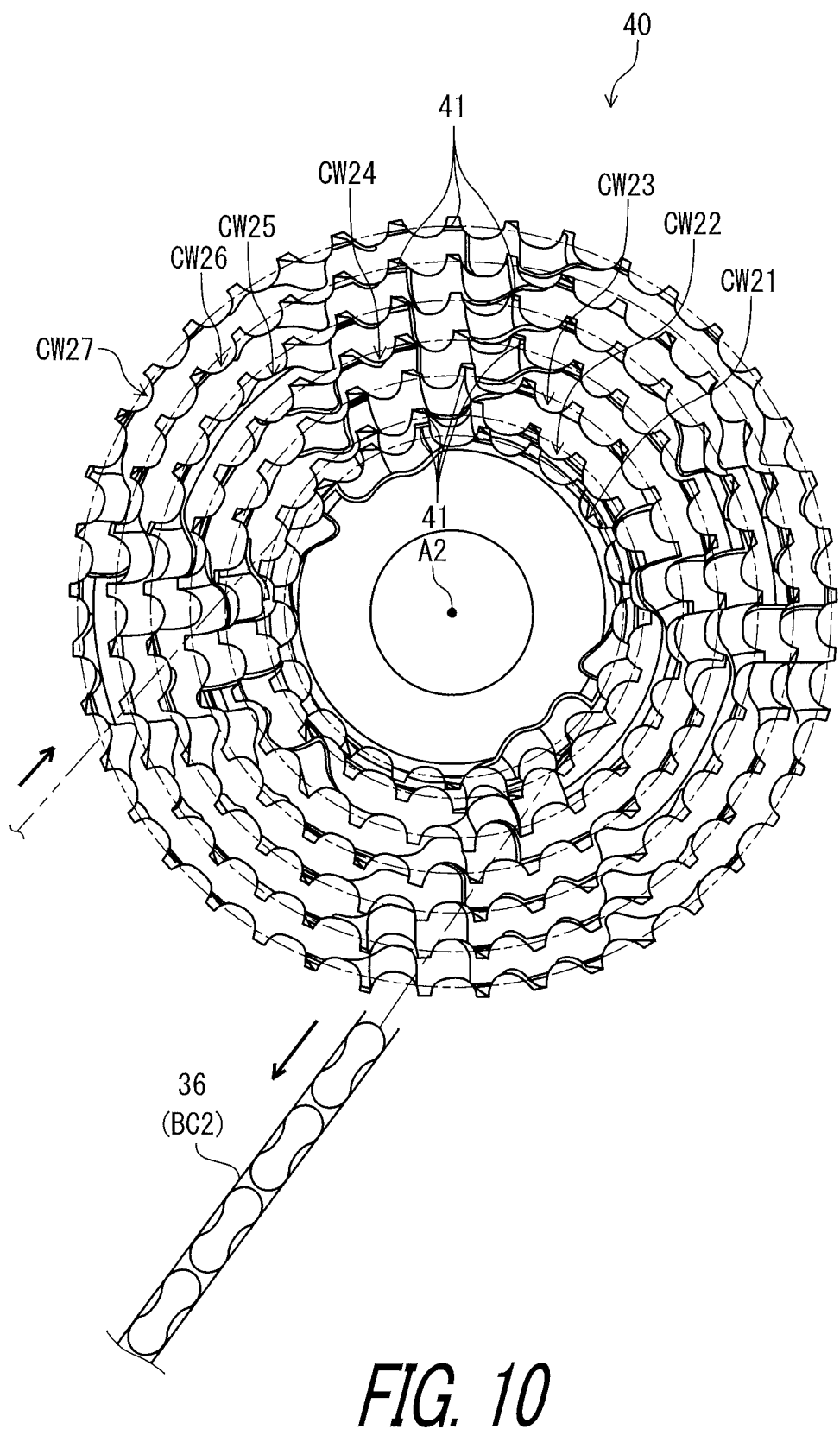
FIG. 10 is a side elevational view of a second transmission member of the bicycle internal transmission device illustrated in FIG. 1.

Further, the bicycle internal transmission device 12 comprises a first coupling member 36, an output shaft 38, and a second transmission member 40. The output shaft 38 has a second rotational axis A3 which is preferably substantially parallel to the input rotational axis A1. As seen in FIG. 8, the output shaft 38 is rotatably mounted to the housing 18 about the second rotational axis A3 via the output bearing assemblies 39. The second transmission member 40 is coupled to the output shaft 38 to rotate together with the output shaft 38 relative to the housing 18 about the second rotational axis A3. The second transmission member 40 includes a plurality of second cogwheels CW21 to CW27 arranged in the axial direction D1, which are described in detail below. The first coupling member 36 is configured to couple the first transmission member 34 to the second transmission member 40 to transmit rotation of the first transmission member 34 to the second transmission member 40 at a variable speed stage. As seen in FIG. 4, the first coupling member 36 comprises a bicycle chain BC2. In addition, as seen in FIG. 9, each of the plurality of the first cogwheels CW11 to CW17 comprises a sprocket including first teeth 35 to be engageable with the first coupling member 36. As seen in FIG. 10, each of the plurality of the second cogwheels CW21 to CW27 comprises a sprocket including second teeth 41 to be engageable with the first coupling member 36. As seen in FIG. 4, the first transmission member 34 and the second transmission member 40 partially overlap with each other when viewed from the axial direction D1.

As seen in FIG. 8, the bicycle internal transmission device 12 further comprises an output cogwheel 42. The output cogwheel 42 is configured to be coupled to the output shaft 38 to rotate together with the output shaft 38 relative to the housing 18 about the second rotational axis A3. Namely, the second transmission member 40, the output shaft 38, and the output cogwheel 42 are rotatable integrally with each other relative to the housing 18 about the second rotational axis A3. The output cogwheel 42 comprises a sprocket including teeth. The pedaling force is transmitted from the input shaft 20 to the output cogwheel 42 via the input cogwheel 26, the input coupling member 28, the intermediate cogwheel 32, the first transmission member 34, the first coupling member 36, and the second transmission member 40.

In the illustrated embodiment, the input cogwheel 26 is provided on a first side SD1 relative to the first transmission member 34 in the axial direction D1. The intermediate cogwheel 32 is provided on the first side SD1 relative to the first transmission member 34 in the axial direction D1. The output cogwheel 42 is provided on the first side SD1 relative to the first transmission member 34 in the axial direction D1.

As seen in FIG. 6, the output cogwheel 42 is provided outside the housing 18. As seen in FIGS. 1 and 6, an output coupling member 44 such as a bicycle chain engages with the output cogwheel 42 and a rear sprocket B9 (FIG. 1) of the bicycle 10. As seen in FIG. 1, the rear sprocket B9 is coupled to the rear wheel B62 via a freewheel (not shown) to rotatable integrally with the rear wheel B62 in a rotational driving direction. Rotation of the output cogwheel 42 is transmitted to the rear wheel B62 via the output coupling member 44 and the rear sprocket B9.

As seen in FIG. 8, the first transmission member 34 is movable relative to the housing 18 in the axial direction D1 parallel to the input rotational axis A1. The second transmission member 40 is stationary relative to the housing 18 in the axial direction D1. In the illustrated embodiment, the first transmission member 34 is movable relative to the housing 18 and the second transmission member 40 between a first axial position P1 and a second axial position P2 in the axial direction D1. The first transmission member 34 is configured to be positioned by a positioning mechanism 46 such as a ball screw mechanism.

The variable speed stage of the bicycle internal transmission device 12 is variable in accordance with at least one positional relationship among the first transmission member 34, the second transmission member 40, and the first coupling member 36 in the axial direction D1. The axial direction D1 includes a first axial direction D11 and a second axial direction D12 opposite to the first axial direction D11. More specifically, the speed stage is determined based on a pair of a first cogwheel out of the plurality of the first cogwheels CW11 to CW27 and a second cogwheel out of the plurality of the second cogwheels CW21 to CW27.

Figure 11:
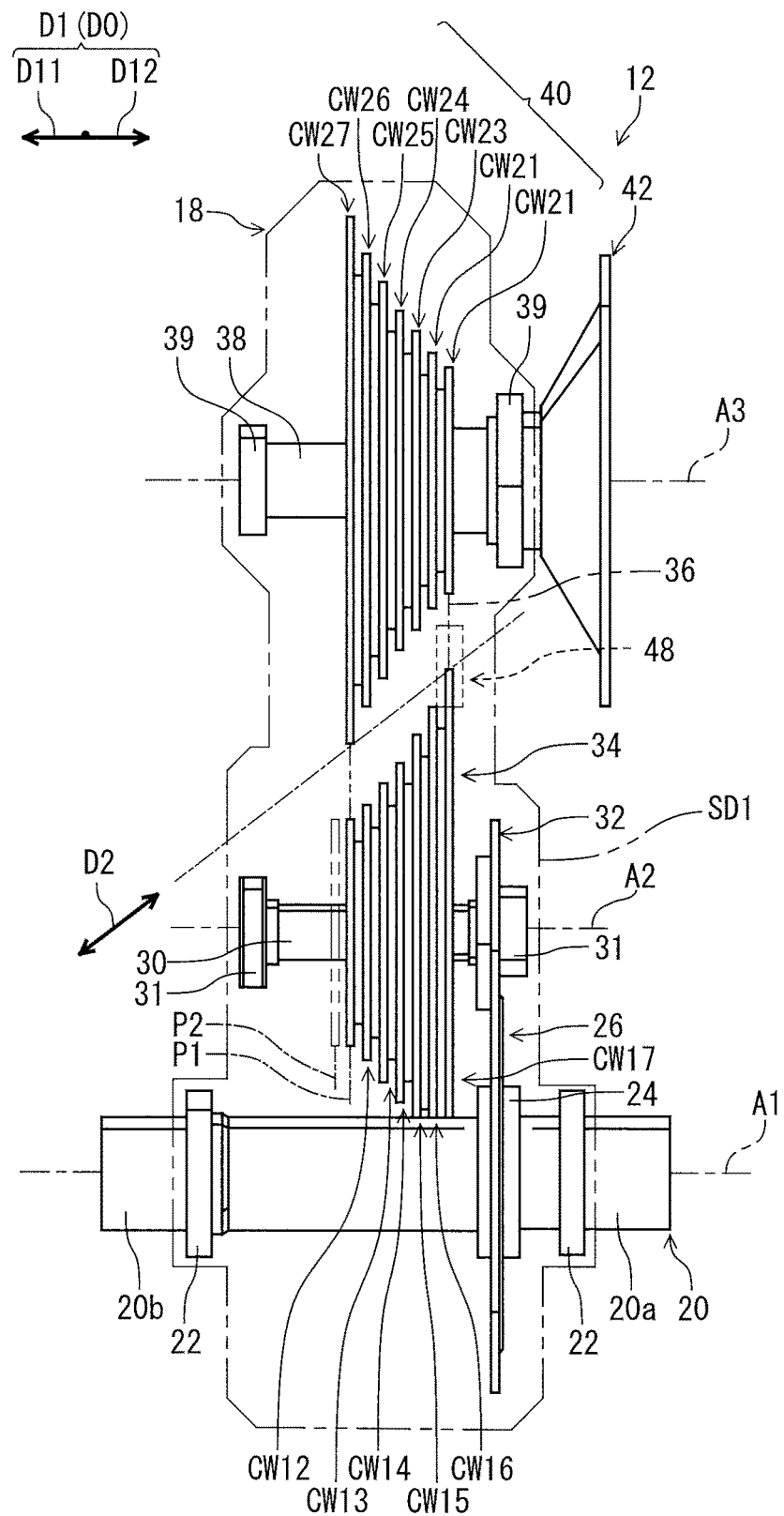
FIG. 11 is another plan view of the bicycle internal transmission device illustrated in FIG. 1 without the housing when viewed diagonally backward.

As seen in FIG. 11, the bicycle internal transmission device 12 further comprises a chain guiding mechanism 48. The chain guiding mechanism 48 is configured to guide the first coupling member 36 to change at least one of a first relative position between the first coupling member 36 and the first transmission member 34, and a second relative position between the first coupling member 36 and the second transmission member 40. The chain guiding mechanism 48 is provided in the housing 18 and mounted to the housing 18. The chain guiding mechanism 48 can have a similar structure to a structure of a bicycle rear derailleur. The chain guiding mechanism 48 is configured to move in a first guide direction D2 to change at least one of the first relative position and the second relative position.

Figure 12:
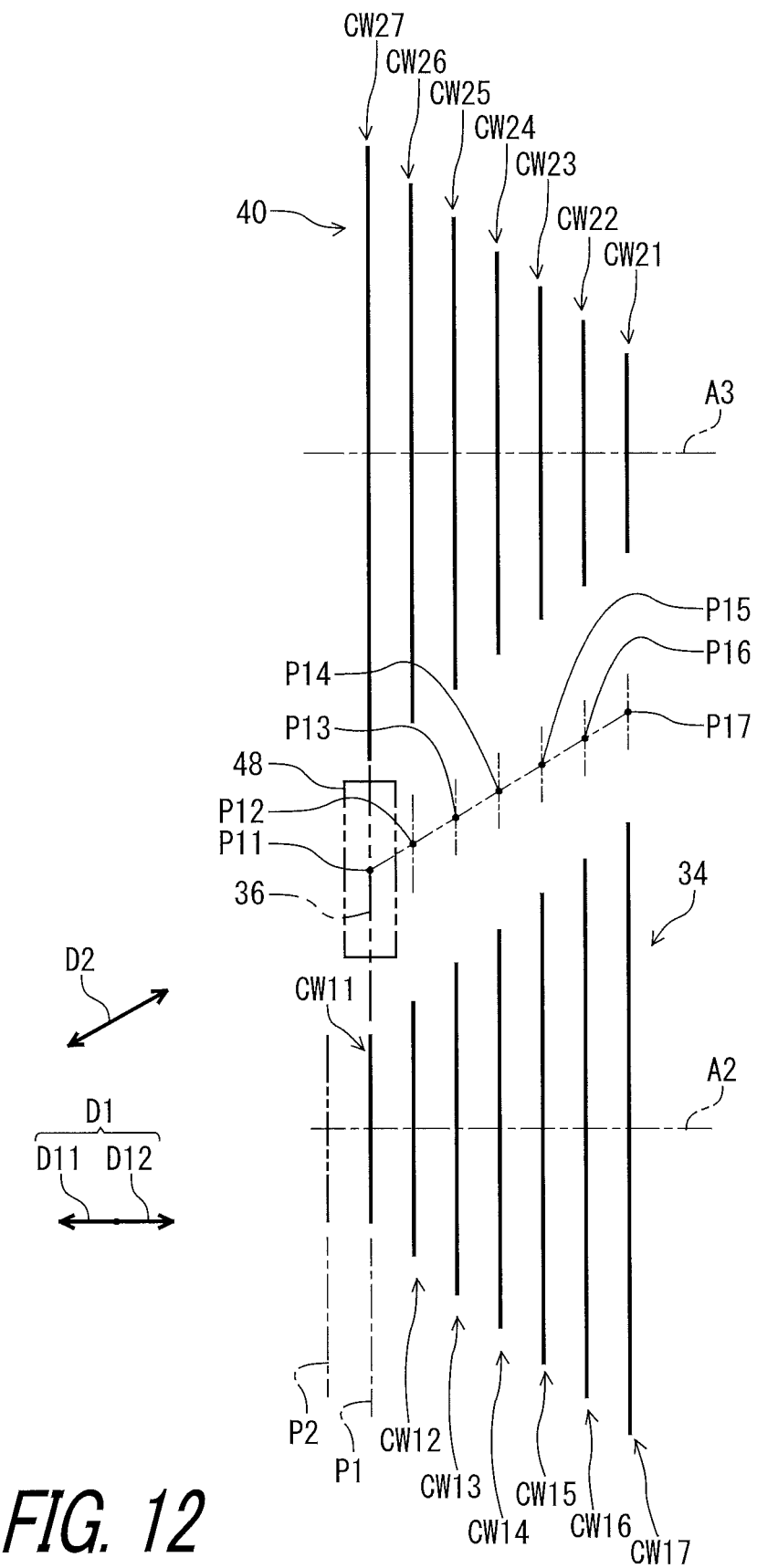
FIG. 12 is a schematic diagram showing an arrangement of the first transmission member, the second transmission member, and a chain guiding mechanism of the bicycle internal transmission device illustrated in FIG. 1.

More specifically, as seen in FIG. 12, the chain guiding mechanism 48 is configured to move between first to seventh guide positions P11 to P17 in the first guide direction D2. In the illustrated embodiment, the first guide direction D2 is not parallel to the axial direction D1. However, the first guide direction D2 can be parallel to the axial direction D1 if needed and/or desired. The first to seventh guide positions P11 to P17 respectively correspond to the plurality of the second cogwheels CW27 to CW21.

Figure 13:
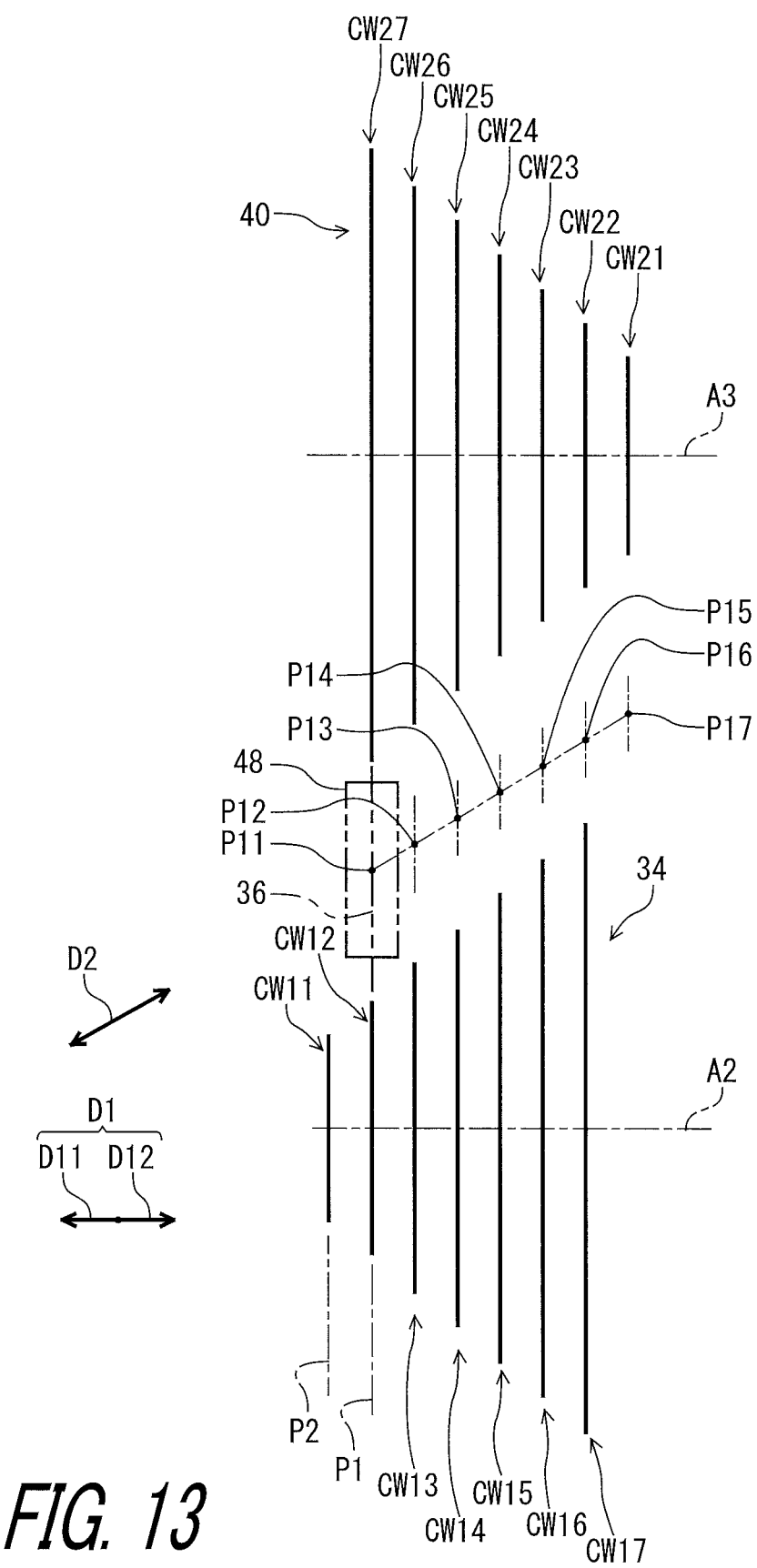
FIG. 13 is a schematic diagram showing an arrangement of the first transmission member, the second transmission member, and the chain guiding mechanism of the bicycle internal transmission device illustrated in FIG. 1.

As seen in FIGS. 12 and 13, the first transmission member 34 is movable relative to the housing 18 and the first coupling member 36 in the first axial direction D11 without changing an axial relative position between the first coupling member 36 and the second transmission member 40 during upshifting. The first transmission member 34 is movable relative to the housing 18 and the first coupling member 36 in the second axial direction D12 without changing the axial relative position between the first coupling member 36 and the second transmission member 40 during the downshifting.

Figure 14:
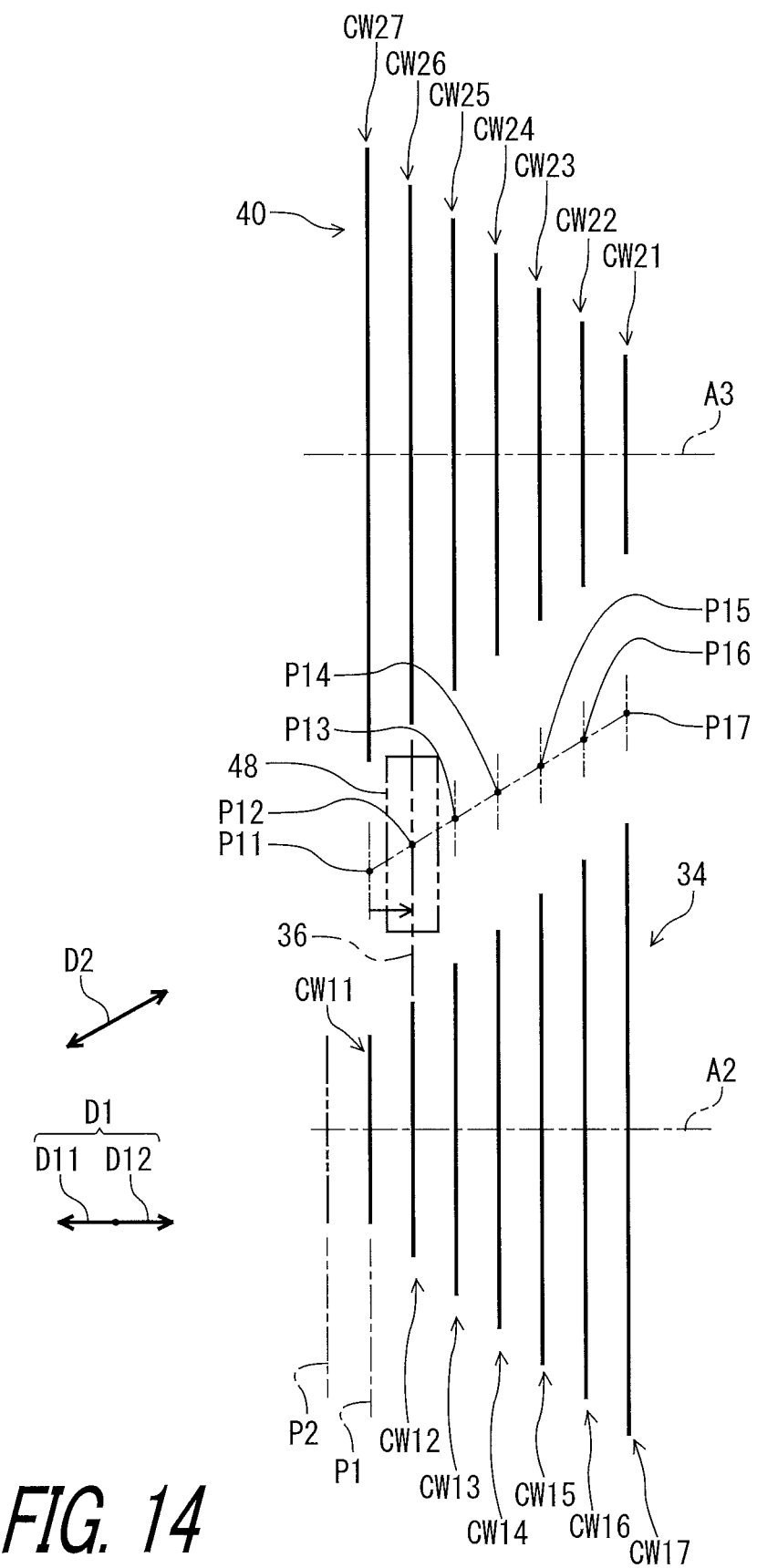
FIG. 14 is a schematic diagram showing an arrangement of the first transmission member, the second transmission member, and the chain guiding mechanism of the bicycle internal transmission device illustrated in FIG. 1.

As seen in FIGS. 13 and 14, the first transmission member 34 is movable together with the first coupling member 36 relative to the housing 18 in the second axial direction D12 so as to change the axial relative position between the first coupling member 36 and the second transmission member 40 during the upshifting. The first transmission member 34 is movable together with the first coupling member 36 relative to the housing 18 in the first axial direction D11 so as to change the axial relative position between the first coupling member 36 and the second transmission member 40 during the downshifting.

Figure 15:
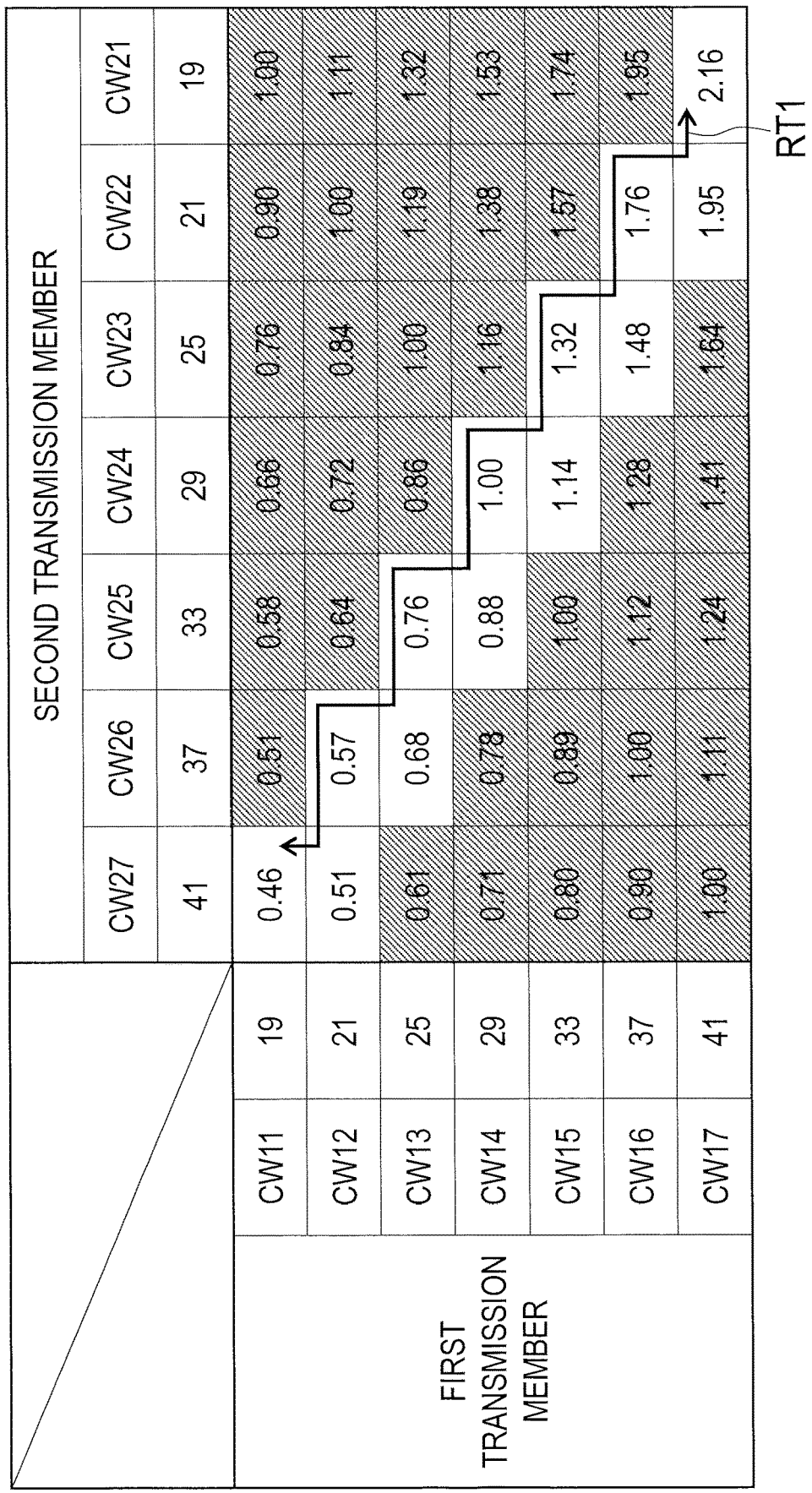
FIG. 15 shows an example of gear ratios defined by the first transmission member and the second transmission member of the bicycle internal transmission device illustrated in FIG. 1.

FIG. 15 shows a total number of first teeth 35 in each of the plurality of the first cogwheels CW11 to CW17, a total number of second teeth 41 in each of the plurality of the second cogwheels CW21 to CW27, and gear ratios defined the first cogwheels CW11 to CW17 and the second cogwheels CW21 to CW27. The transmission route RT1 is defined by thirteen gear ratios among the gear ratios defined by the first cogwheels CW11 to CW17 and the second cogwheels CW21 to CW27. Data related to the transmission route RT1 is stored in a memory (not shown). The positioning mechanism 46 and the chain guiding mechanism 48 are controlled by a transmission controller (not shown) configured to operate based on the transmission route RT1 setting a gear ratio in accordance with an electric signal from the shift operating device 14.

As seen in FIG. 4, the housing 18 includes an internal space 18i in which the input cogwheel 26, the input coupling member 28, the intermediate cogwheel 32, the first transmission member 34, the first coupling member 36, and the second transmission member 40 are provided. The housing 18 is configured to store lubricant agent 50 in the internal space 18i. The lubricant agent 50 is configured to lubricate at least one of the input cogwheel 26, the input coupling member 28, the intermediate cogwheel 32, the first transmission member 34, the first coupling member 36, and the second transmission member 40. More preferably, the lubricant agent 50 is configured to lubricate at least one of the input coupling member 28 (the bicycle chain BC1) and the first coupling member 36 (the bicycle chain BC2). In the following description, a bicycle chain which is lubricated by the lubricant agent 50 is referred to as a bicycle chain 52.

Figure 16:
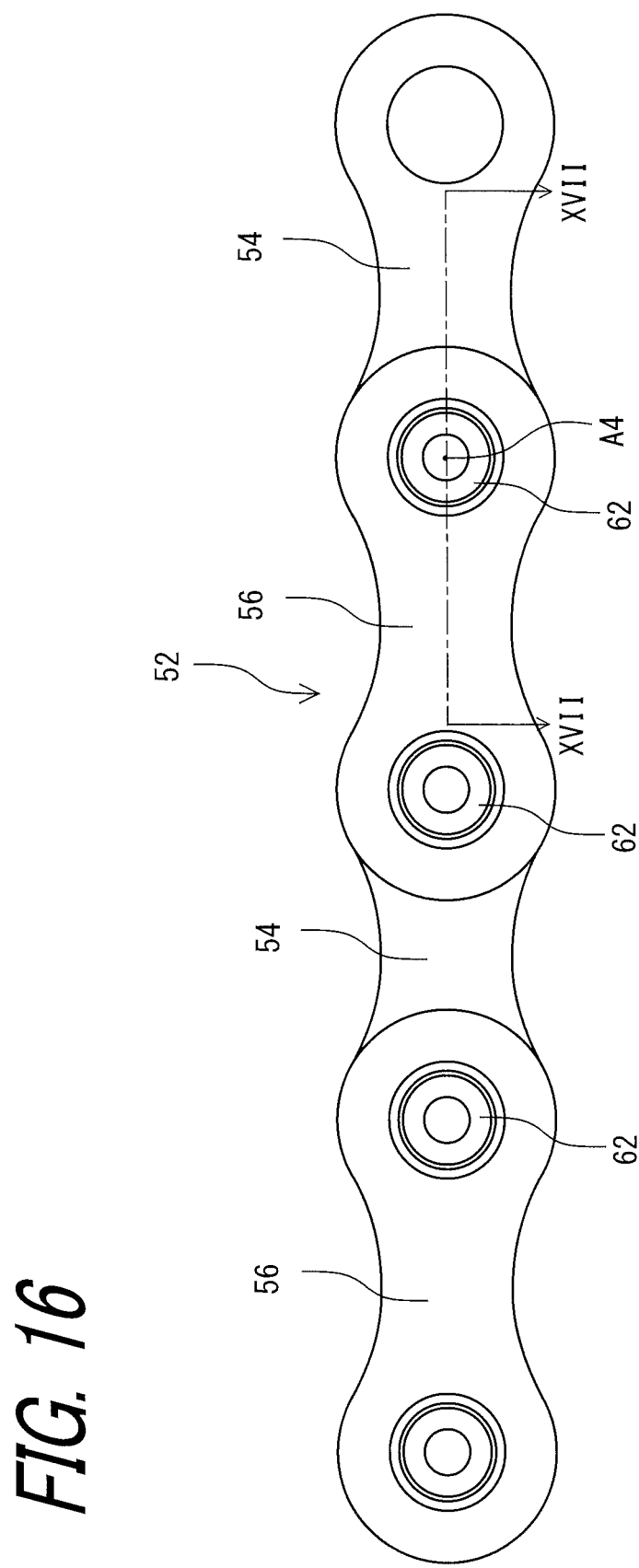
FIG. 16 is a front elevational view of a bicycle chain.
Figure 17:
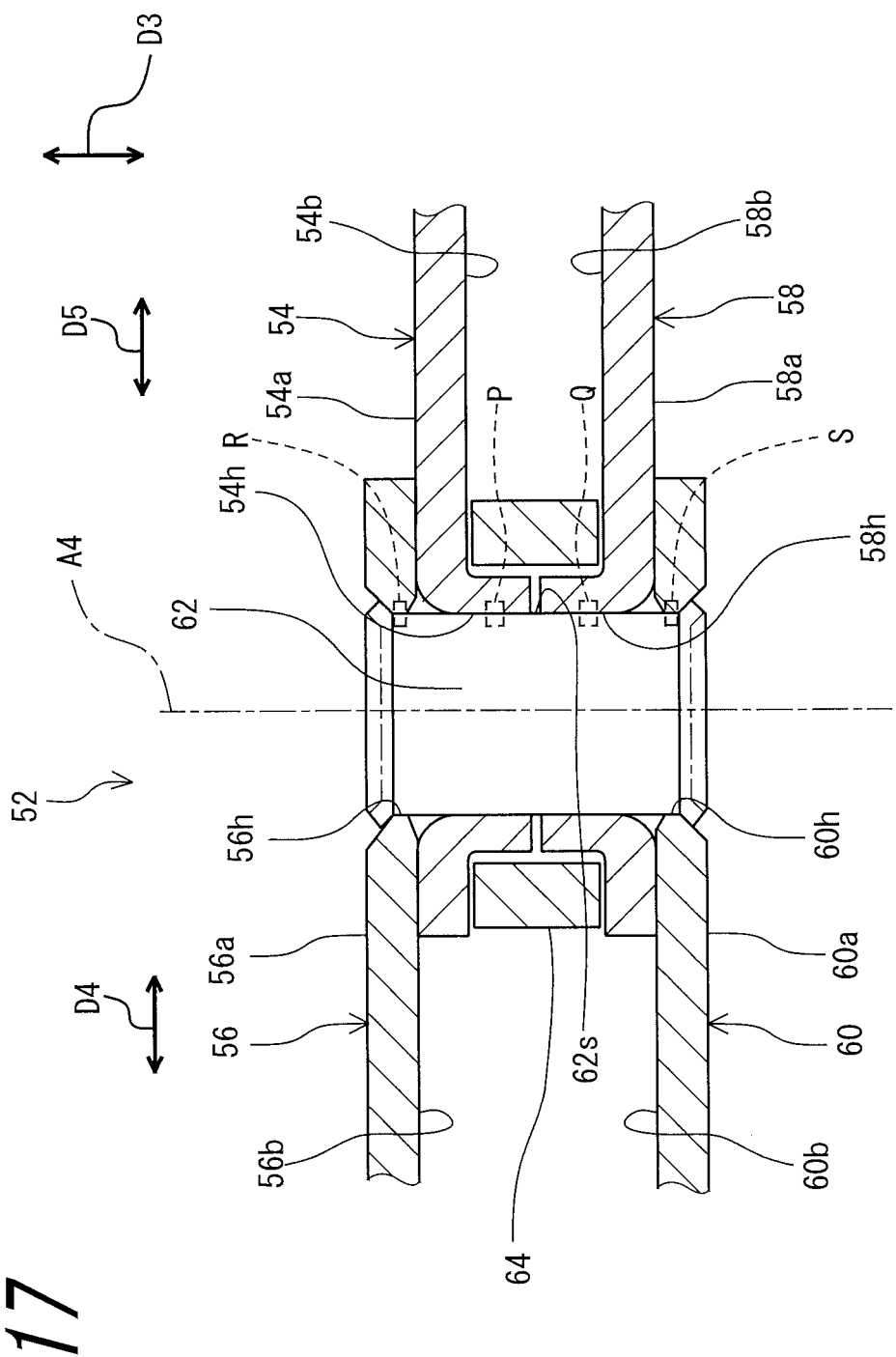
FIG. 17 is a partial cross-sectional view of the bicycle chain taken along line XVII-XVII illustrated in FIG. 16.

As seen in FIGS. 16 and 17, the bicycle chain 52 includes an inner link plate 54 and an outer link plate 56. Further, as seen in FIG. 17, the bicycle chain 52 includes an inner link plate 58 and an outer link plate 60. For convenience of explanation, the inner link plate 54 can be also referred to as a first inner link plate 54. The inner link plate 58 can be also referred to as a second inner link plate 58. The outer link plate 56 can be also referred to as a first outer link plate 56. The outer link plate 60 can be referred to as a second outer link plate 60. More specifically, the bicycle chain 52 includes a plurality of the first inner link plates 54, a plurality of the second inner link plates 58, a plurality of the first outer link plates 56, and a plurality of the second outer link plates 60.

As seen in FIGS. 16 and 17, the bicycle chain 52 includes a pin 62. More specifically, the bicycle chain 52 includes a plurality of the pins 62. Each of the plurality of the pins 62 has a cylindrical shape having a center axis A4 and extends in a pin axial direction D3. Each of the plurality of the second inner link plates 58 is opposite to a corresponding one of the plurality of the first inner link plates 54 in the pin axial direction D3. Each of the plurality of the second outer link plates 60 is opposite to a corresponding one of the plurality of the first outer link plates 56 in the pin axial direction D3. Pairs of the first inner link plate 54 and the second inner link plate 58 are disposed in alternating fashion between pairs of the first outer link plate 56 and the second outer link plate 60. Each of the plurality of the pins 62 connects one of the plurality of the first inner link plates 54, one of the plurality of the second inner link plates 58, one of the plurality of the first outer link plates 56, and one of the plurality of the second outer link plates 60.

As seen in FIGS. 16 and 17, the bicycle chain 52 includes a roller 64. More specifically, the bicycle chain 52 includes a plurality of the rollers 64. Each of the plurality of the rollers 64 is disposed between one of the plurality of the first inner link plates 54 and the corresponding one of the plurality of the second inner link plates 58 that is opposite to the one of the plurality of the first inner link plates 54. Each of the plurality of rollers 64 is supported by one of the plurality of the first inner link plates 54 and the corresponding one of the plurality of the second inner link plates 58 that is opposite to the one of the plurality of the first inner link plates 54, and is rotatable about the center axis A4 of the one of the plurality of the pins 62.

Each of the plurality of the first inner link plates 54, the plurality of the second inner link plates 58, the plurality of the first outer link plates 56, and the plurality of the second outer link plates 60 is a plate member having a gourd shape. Each of the plurality of the first outer link plates 56 includes a first outer surface 56a and a first inner surface 56b opposite to the first outer surface 56a in the pin axial direction D3. Each of the plurality of second outer link plates 60, which is opposite to the each of the plurality of first outer link plates 56, includes a second outer surface 60a and a second inner surface 60b opposite to the second outer surface 60a in the pin axial direction D3. The first inner surface 56b faces the second inner surface 60b in the pin axial direction D3. Each of the plurality of the first inner link plates 54 includes a third outer surface 54a and a third inner surface 54b opposite to the third outer surface 54a in the pin axial direction D3. Each of the plurality of the second inner link plates 58, which is opposite to the each of the plurality of the first inner link plates 54, includes a fourth outer surface 58a and a fourth inner surface 58b opposite to the fourth outer surface 58a in the pin axial direction D3. The third inner surface 54b faces the fourth inner surface 58b in the pin axial direction D3.

Each of the plurality of the first outer link plates 56 includes two first hole peripheral surfaces 56h at both ends of the each of the plurality of the first outer link plates 56 in an outer link plate transverse direction D4 perpendicular to the pin axial direction D3. Each of the plurality of the second outer link plates 60, which is opposite to the each of the plurality of the first outer link plates 56, includes two second hole peripheral surfaces 60h at both ends of the each of the plurality of the second outer link plates 60 in the outer link plate transverse direction D4. Each of the plurality of the first inner link plates 54, which is connected to the each of the plurality of the first outer link plates 56, includes two third hole peripheral surfaces 54h at both ends of the each of the plurality of the first inner link plates 54 in an inner link plate transverse direction D5 perpendicular to the pin axial direction D3. Each of the plurality of the second inner link plates 58, which is opposite to the each of the plurality of first inner link plates 54, includes two fourth hole peripheral surfaces 58h at both ends of the each of the plurality of second inner link plates 58 in the inner link plate transverse direction D5. The first hole peripheral surface 56h, the second hole peripheral surface 60h, the third hole peripheral surface 54h, and the fourth hole peripheral surface 58h define a linking hole in which the pin 62 is provided. The pin 62 is provided on the first hole peripheral surface 56h, the second hole peripheral surface 60h, the third hole peripheral surface 54h, and the fourth hole peripheral surface 58h. A cylindrical surface 62s of the pin 62 rubs against the first hole peripheral surface 56h, the second hole peripheral surface 60h, the third hole peripheral surface 54h, and the fourth hole peripheral surface 58h. That is, the pin 62 is configured to slidably contact the inner link plate 54, 58.

Figure 18:
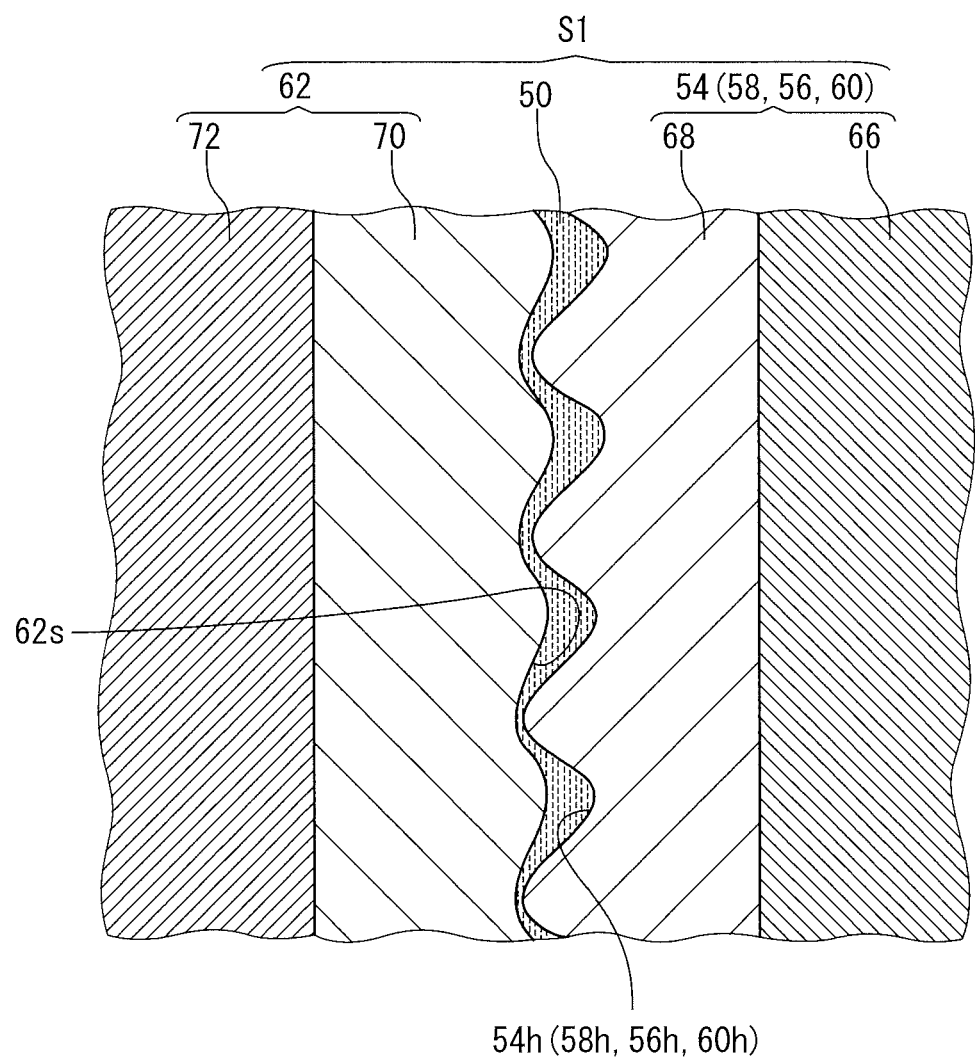
FIG. 18 is an enlarged exemplary view of at least one of a part P, a part Q, a part R, and a part S of the bicycle chain illustrated in FIG. 17.

In this case, as seen in FIG. 18, the lubricant agent 50 can be accumulated between the pin 62 and the inner link plate 54 adjacent to the third hole peripheral surface 54h due to surface tension. Similarly, the lubricant agent 50 is accumulated between the pin 62 and the inner link plate 58 adjacent to the fourth hole peripheral surface 58h. Further, the lubricant agent 50 can be accumulated between the pin 62 and the outer link plate 56 adjacent to the first hole peripheral surface 56h due to surface tension. Similarly, the lubricant agent 50 is accumulated between the pin 62 and the outer link plate 60 adjacent to the second hole peripheral surface 60h due to surface tension. Accordingly, the lubricant agent 50 is accumulated between the pin 62 and at least one of the inner link plates 54, 58 and the outer link plates 56, 60.

Therefore, as seen in FIG. 18, the lubricant agent 50, the pin 62, and at least one of the inner link plates 54, 58 and the outer link plates 56, 60 constitute a sliding component S1. Accordingly, the bicycle internal transmission device 12 comprises the sliding component S1. The sliding component S1 is disposed in the housing 18. The sliding component S1 comprises a base member 66, a plated layer 68, and the lubricant agent 50. At least one of the inner link plate 54, 58 and the outer link plate 56, 60 includes the base member 66 and the plated layer 68. In other words, the sliding component S1 further comprises the bicycle chain 52 including the base member 66 and the plated layer 68. Preferably, the inner link plate 54, 58 includes the base member 66 and the plated layer 68.

The base member 66 is made of a metallic material such as iron or a stainless steel. The plated layer 68 is disposed on the base member 66. The plated layer 68 forms at least one of the first hole peripheral surface 56h, the second hole peripheral surface 60h, the third hole peripheral surface 54h, and the fourth hole peripheral surface 58h. Preferably, the plated layer 68 forms the third hole peripheral surface 54h and the fourth hole peripheral surface 58h. The plated layer 68 includes a metallic material. Preferably, the plated layer has Vickers hardness ranging from 10 HV to 200 HV. Accordingly, preferably, the plated layer 68 includes tin (Sn). The Vickers hardness of a tin-plated material ranges 5 HV to 60 HV. Alternatively, the plated layer 68 includes silver (Ag). The Vickers hardness of a silver-plated material ranges 50 HV to 100 HV.

The lubricant agent 50 contacts the plated layer 68. The lubricant agent 50 includes a fatty acid containing a carboxyl group. Preferably, the fatty acid includes a stearic acid. More preferably, the fatty acid includes an olein acid. Further preferably, the fatty acid acid includes a linoleic acid.

Preferably, the sliding component S1 further comprises a chromized layer 70 to slidably contact the plated layer 68. That is, the pin 62 is chromized. The pin 62 includes an additional base member 72 and the chromized layer 70 provided on the additional base member 72. The additional base member 72 is made of a metallic material such as iron or a stainless steel. However, in this embodiment, the pin 62 may not be chromized. In this case, the cylindrical surface 62s of the pin 62 is usually made of iron or a stainless steel.

Figure 19:
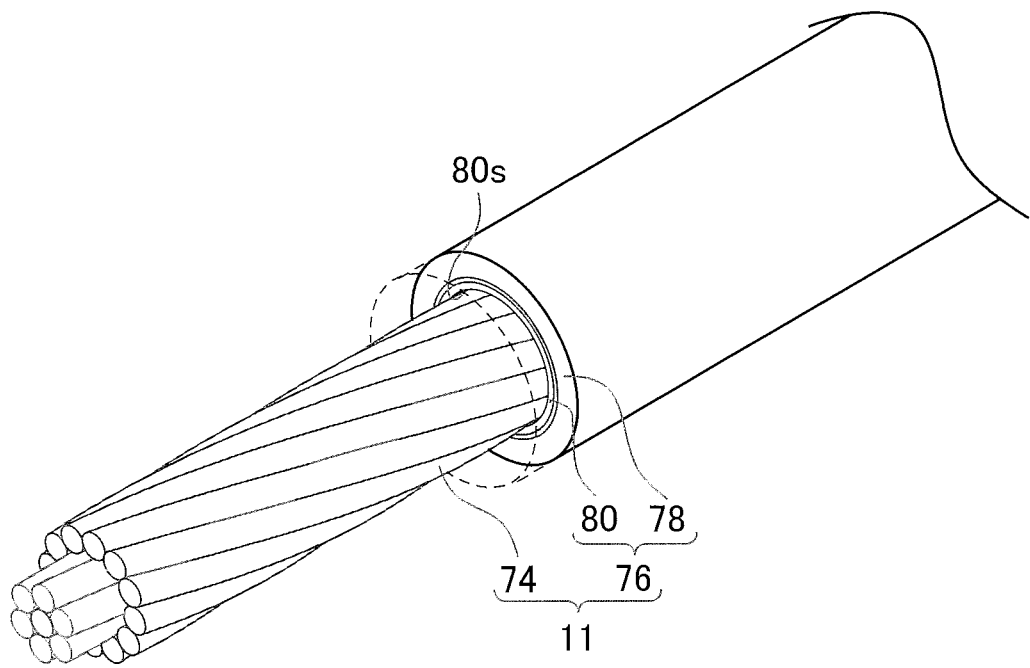
FIG. 19 is a perspective view of a Bowden cable of the bicycle illustrated in FIG. 1.
Figure 20:
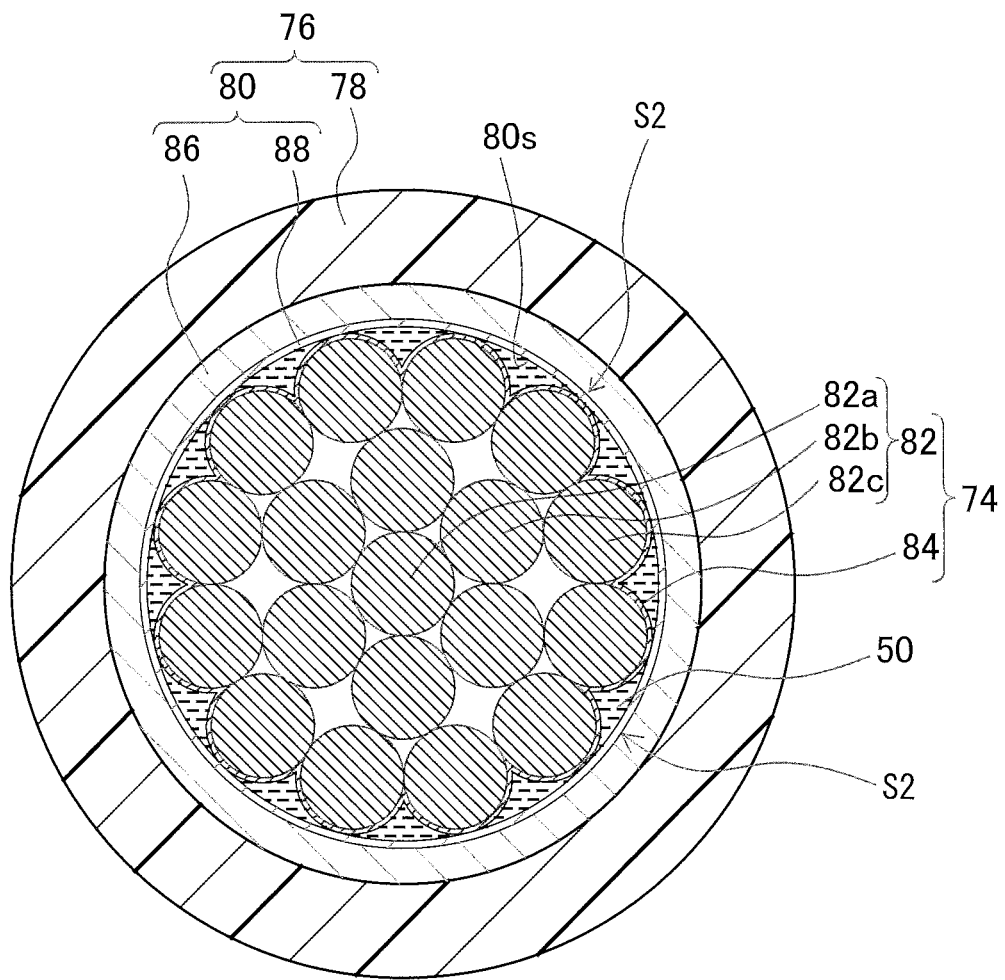
FIG. 20 is a schematically cross-sectional view of the Bowden cable illustrated in FIG. 19.

As seen in FIG. 19, the Bowden cable 11 includes an inner wire 74 and an outer casing (an outer member) 76. The outer casing 76 at least partly accommodates the inner wire 74. The outer casing 76 includes an outer resin tube 78 and a reinforcing member 80 which is provided in the outer resin tube 78 and which is formed by braiding steel wires. The inner wire 74 is configured to slide on an inner surface 80s of the reinforcing member 80 in response to a user's operation of the front brake operating device B41 or the rear brake operating device B42. As seen in FIG. 20, the inner wire 74 includes a base member 82 and a plated layer 84. The base member 82 includes a bundle of strands. The plated layer 84 is configured to coat the base member 82 to protect the base member 82 from being corroded.

The base member 82 comprises a first strand 82a, six second strands 82b, and twelve third strand 82c. The first strand 82a is provided in a center of the bundle of strands 82. The second strands 82b are twisted around the first strand 82a. The third strands 82c are twisted around the second strands 82b. In the illustrated embodiment, the first to third strands 82a to 82c have the same size and are made of the same material.

In this embodiment, the reinforcing member 80 is preferably chromized. Accordingly, the reinforcing member 80 includes another base member 86 and a chromized layer 88. The lubricant agent 50 is provided between the plated layer 84 and the chromized layer 88. Preferably, the Bowden cable 11 further includes an oil seal at both ends of the outer casing 76 so as to keep the lubricant agent 50 in the outer casing 76. The lubricant agent 50, the chromized layer 88, the base member 82, and the plated layer 84 constitute a sliding component S2. That is, the sliding component S2 further comprises the Bowden cable 11 including the base member 82 and the plated layer 84. The base member 82 has substantially the same feature as that of the base member 66. The plated layer 84 has substantially the same feature as that of the plated layer 68. The chromized layer 88 has substantially the same feature of that of the chromized layer 70.

The sliding components S1 and S2 has the following features.

Figure 21:
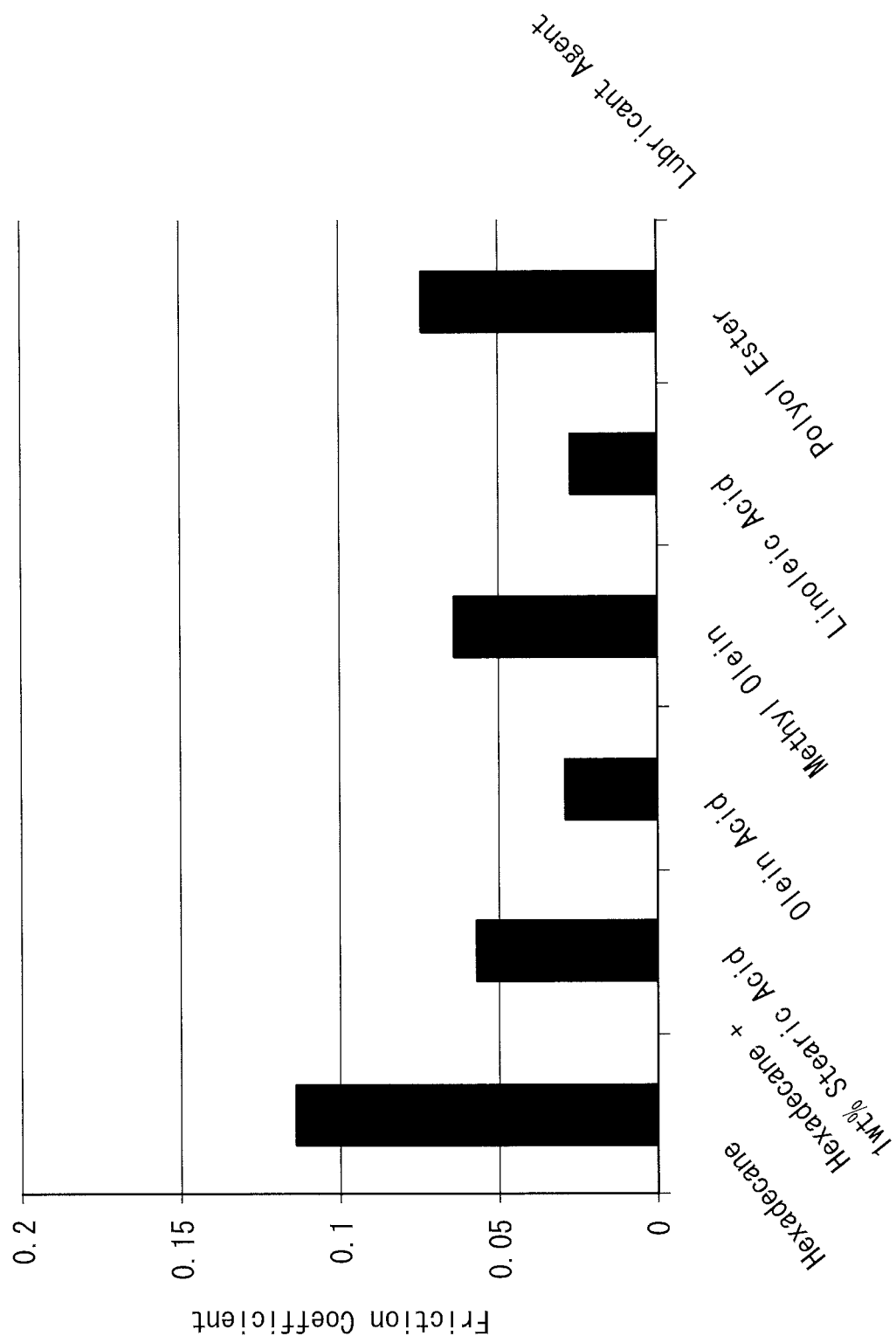
FIG. 21 shows experimental results of friction coefficients between a chromized pin and a tin plate via several types of lubricant agents.

(1) Since the lubricant agent 50 includes a carboxyl group to facilitate adhesion of the lubricant agent 50 to the metallic material of the plated layer 68, 84, the carboxyl group facilitates formation of an oil film on the plated layer 68, 84. Accordingly, a friction coefficient between the plated layer 68, 84 and the chromized layer 70, 88 is decreased. FIG. 21 shows experimental results of friction coefficients between the chromized pin 62 and a tin-plated plate via several types of lubricant agents. In the experiments, the chromized pin 62 is pressed against the tin-plated plate via a lubricant agent shown in a transverse axis under a surface pressure of about 580 MPa which is closed to a surface pressure (about 440 MPa) usually applied to the pin 62 and reciprocates for 1000 cycles. The friction coefficients shown in a vertical axis are measured after the experiments. As seen in FIG. 21, a friction coefficient between the chromized pin 62 and the tin-plated plate via the lubricant agent including a stearic acid, an olein acid, or a stearic acid is significantly lower than a friction coefficient between the chromized pin and the tin-plated plate via the lubricant agent which does not include a fatty acid containing a carboxyl group.

Figure 22:
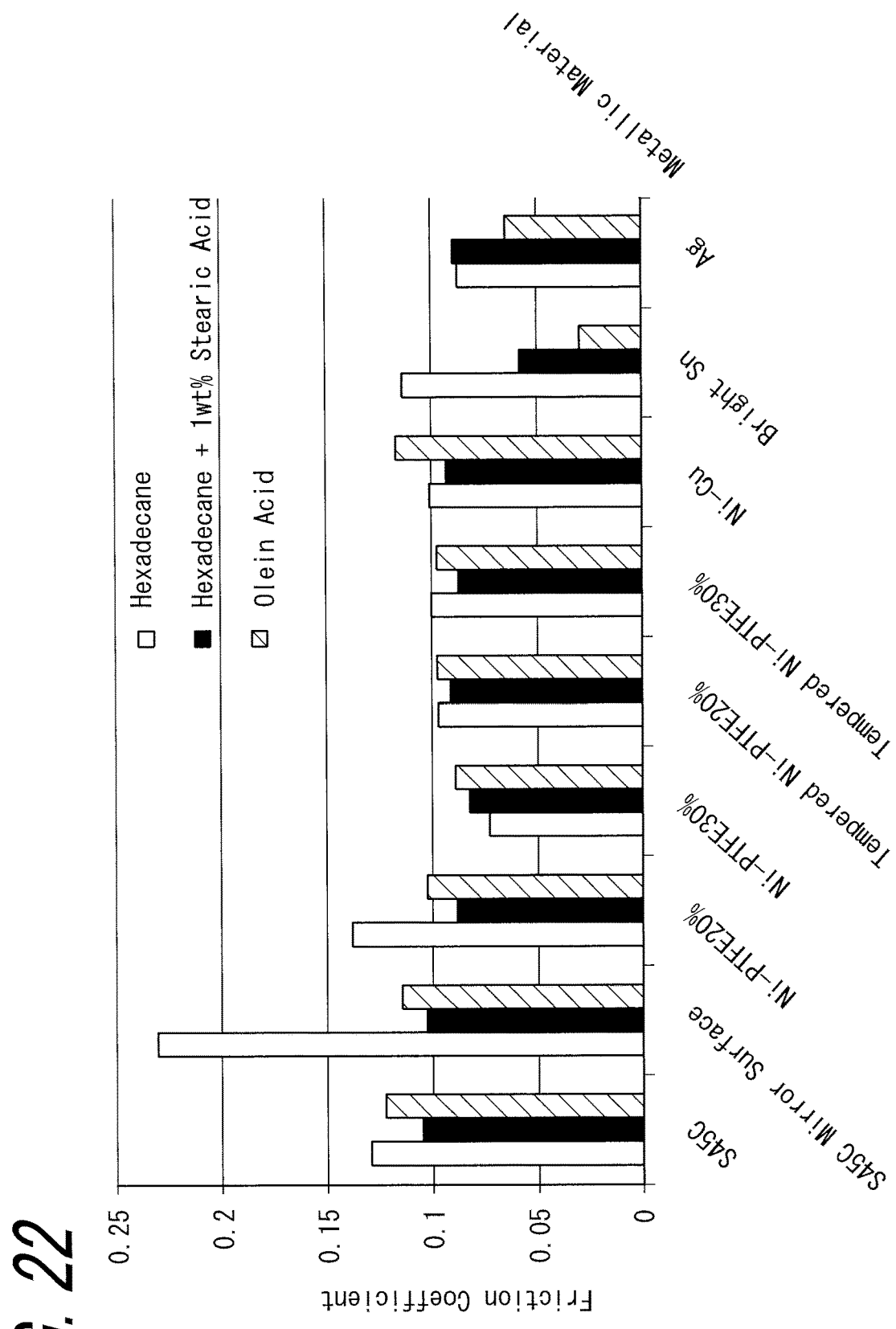
FIG. 22 shows experimental results of friction coefficients between a chromized pin and several types of metallic plates via several types of lubricant agents.

(2) Further, the plated layer 68 includes tin (Sn) or silver (Ag), thereby a friction coefficient between the plated layer 68 and the pin 62 via the lubricant agent 50 including a fatty acid containing a carboxyl group is significantly decreased. FIG. 22 shows experimental results of friction coefficients between the chromized pin 62 and a plate plated with several types of metals via several types of lubricant agents. In the experiments, the chromized pin 62 is pressed against a plate plated with each material shown in a transverse axis via a lubricant agent shown in each bar under a surface pressure of about 580 MPa which is closed to a surface pressure (about 440 MPa) usually applied to the pin 62 and reciprocates for 1000 cycles. The friction coefficients shown in a vertical axis are measured after the experiments. As seen in FIG. 22, a friction coefficient between the chromized pin 62 and a plate plated with tin (Sn) or silver (Ag) via the lubricant agent including a fatty acid containing a carboxyl group is significantly lower than a friction coefficient between the chromized pin 62 and the plate via a lubricant agent including hexadecane which is not a fatty acid containing a carboxyl group, whereas a friction coefficient between the chromized pin 62 and a plate plated with a material other than tin (Sn) or silver (Ag) via a lubricant agent is not significantly changed based on whether the lubricant agent includes a fatty acid containing a carboxyl group or not.

(3) Further, a mutual solubility coefficient between each of tin (Sn) and silver (Ag) and each of iron (Fe) and chrome (Cr), which are materials of the pin 62, is low. Accordingly, even if the oil film is broken, the chromized layer 70 and the plated layer 68 are not agglutinated.

(4) The Vickers hardness of the plated layer 68 ranges from 10 HV to 200 HV, which is relatively low. Accordingly, as seen in a right figure of FIG. 23, an outer surface 68s of the plated layer 68 is plastically deformed to become smoother when the plated layer 68 slides on the chromized layer 70. Therefore, it becomes less possible for the plated layer 68 to directly contact the chromized layer 70, thereby duration of the sliding component S1 and S2 is increased. The plated layer 68 including tin (Sn) whose Vickers hardness ranges 5 HV to 60 HV or silver (Ag) whose Vickers hardness ranges 50 HV to 100 HV has such features.

Figure 23:
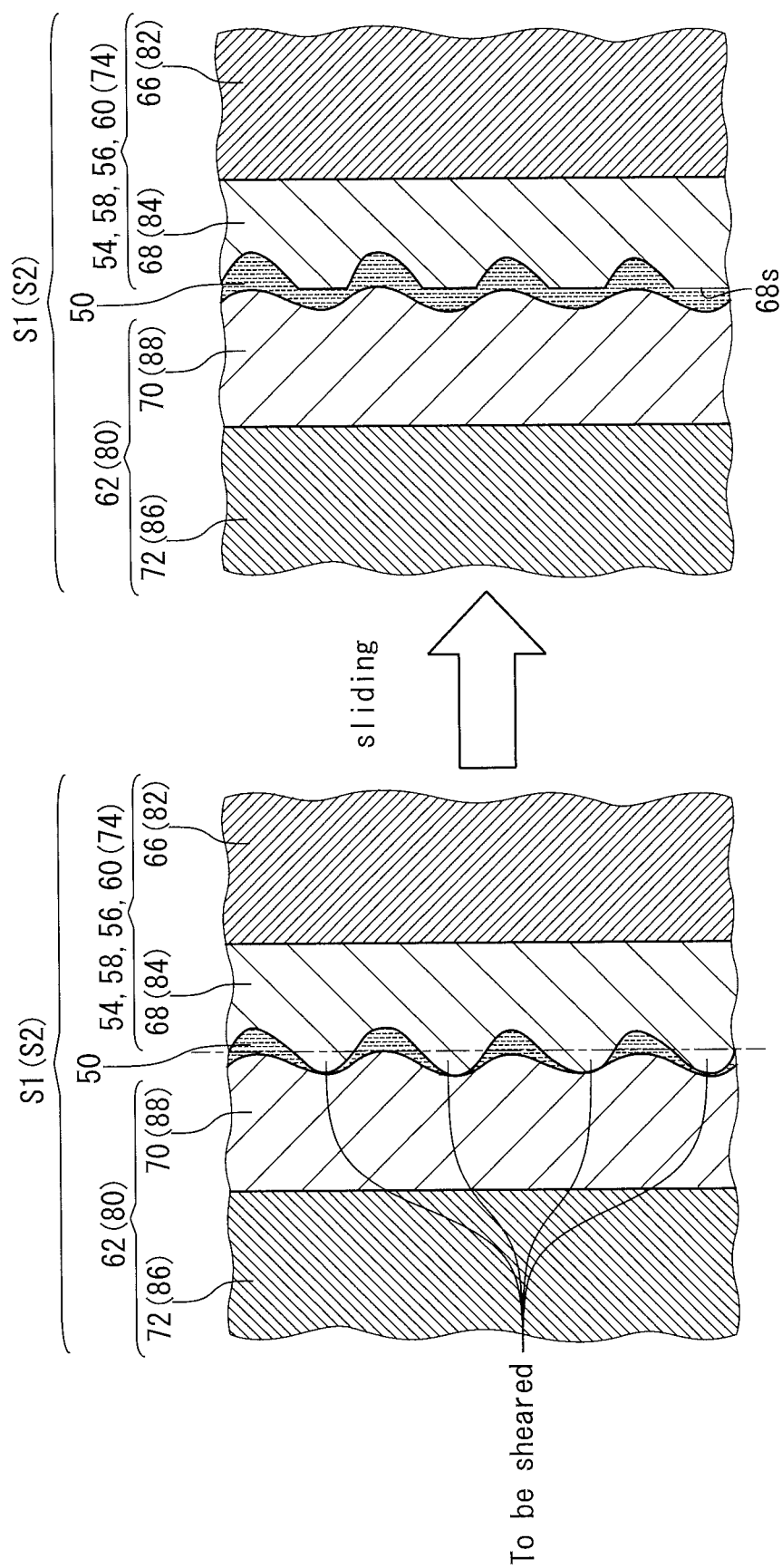
FIG. 23 is an enlarged exemplary view of a sliding component before and after being shear-fractured.

(5) Further, even when the outer surface of the plated layer 68 contacts the chromized layer 70 to be shear-fractured as seen in a left figure of FIG. 23, the friction coefficient between the plated layer 68 and the chromized layer 70 tends not to be increased because a shearing force of tin (Sn) and silver (Ag) is low due to their low Vickers hardness.

In the first embodiment, the plated layer 68, 84 and the chromized layer 70, 88 can be opposite. That is, the layer 68, 84 can be the chromized layer, and the layer 70, 88 can be the plated layer. Further, one of the plated layer and the chromized layer can be provided on at least one of surfaces of teeth of the cogwheels 26, 32, CW11 to CW17, CW21 to CW27, and another of the plated layer and the chromized layer can be provided on inner surfaces 54b, 56b, 58b, and 60b of the bicycle chain 52.

In the Bowden cable 11, the first to third strands 82a to 82c can have different sizes from each other and be made of different materials from each other. For example, the first strand 82a can be thicker than the second and third strands 82b and 82c. The number of the second strands 82b can be different from six. The number of the third strands 82c can be different from twelve.

Second Embodiment

A bicycle 10a provided with a sliding component S3 in accordance with a second embodiment will be described below referring to FIG. 24. The sliding component S3 has the same structure and/or configuration as those of the sliding components S1 and S2. However, the sliding component S3 is provided in a bicycle internal transmission device 12a attached to a rear hub B91 of the bicycle 10a, and the bicycle internal transmission device 12a has a different structure from that of the bicycle internal transmission device 12 described in the first embodiment. In the bicycle 10a, the bicycle internal transmission device 12 is not attached to the bicycle crank B7. Thus, elements having substantially the same function as those in the first embodiment will be numbered the same here, and will not be described and/or illustrated again in detail here for the sake of brevity.

Figure 24:
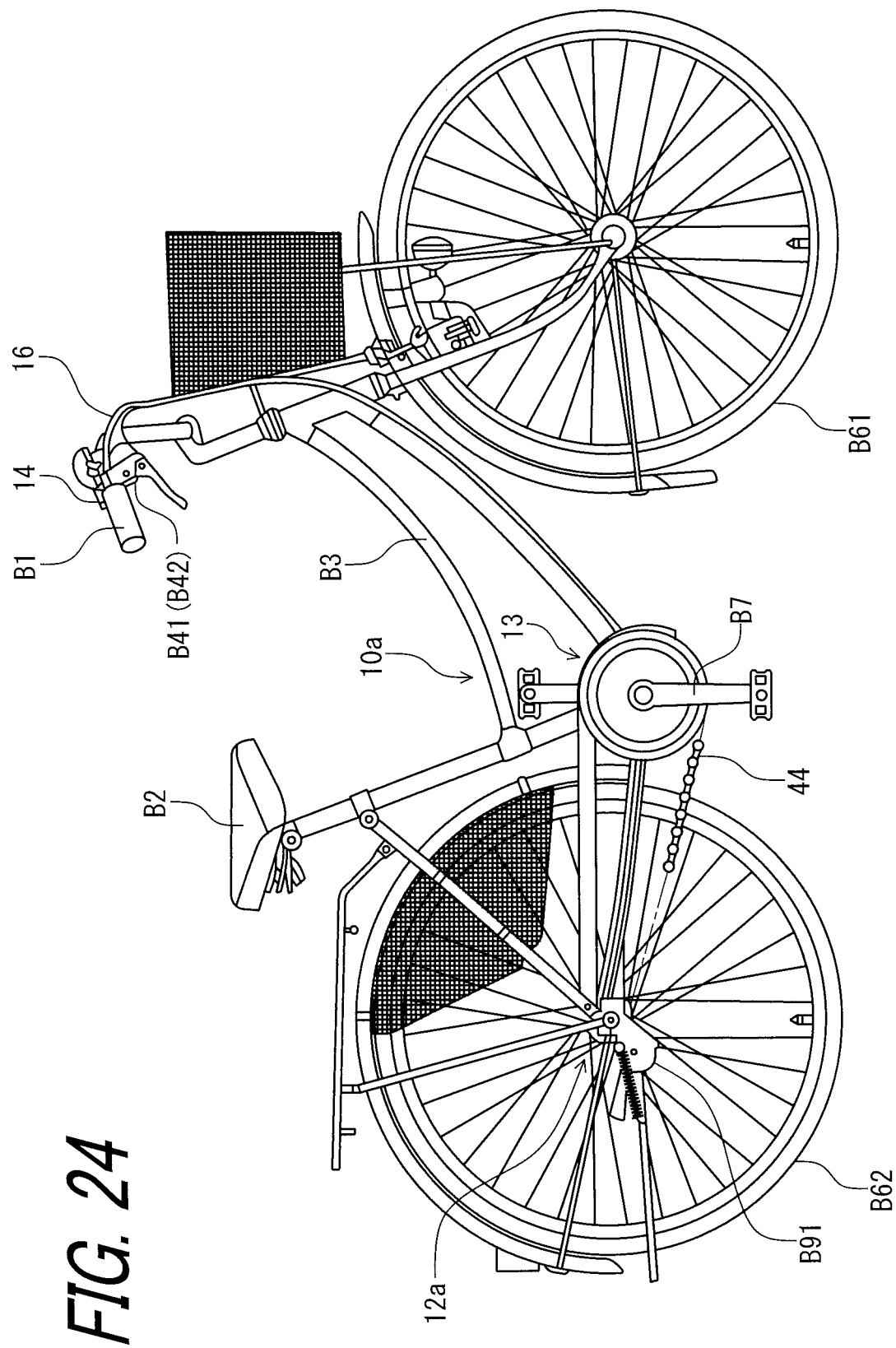
FIG. 24 is a side elevational view of a bicycle provided with a bicycle internal transmission device in accordance with a second embodiment.

As seen in FIG. 24, in the bicycle 10a, the bicycle crank B7, a front sprocket (not shown), the output coupling member 44 (the bicycle chain 44), a rear sprocket 90 (see FIG. 25), and the bicycle internal transmission device 12*a* constitute a bicycle drive train 13. The shift operating device 14 is operatively coupled to the bicycle internal transmission device 12*a*. In the illustrated embodiment, the shift operating device 14 is connected to the bicycle internal transmission device 12*a* via a control cable 16 which is a Bowden cable. While the bicycle internal transmission device 12*a* is actuated in response to a shift operation of the shift operating device 14 in the illustrated embodiment, the shift operating device 14 can be electrically connected to the bicycle internal transmission device 12*a* via the control cable 16 which is, for example, an electrical control cable if needed and/or desired. Furthermore, the bicycle internal transmission device 12*a* and the shift operating device 14 can use a wireless technology if needed and/or desired.

Figure 25:
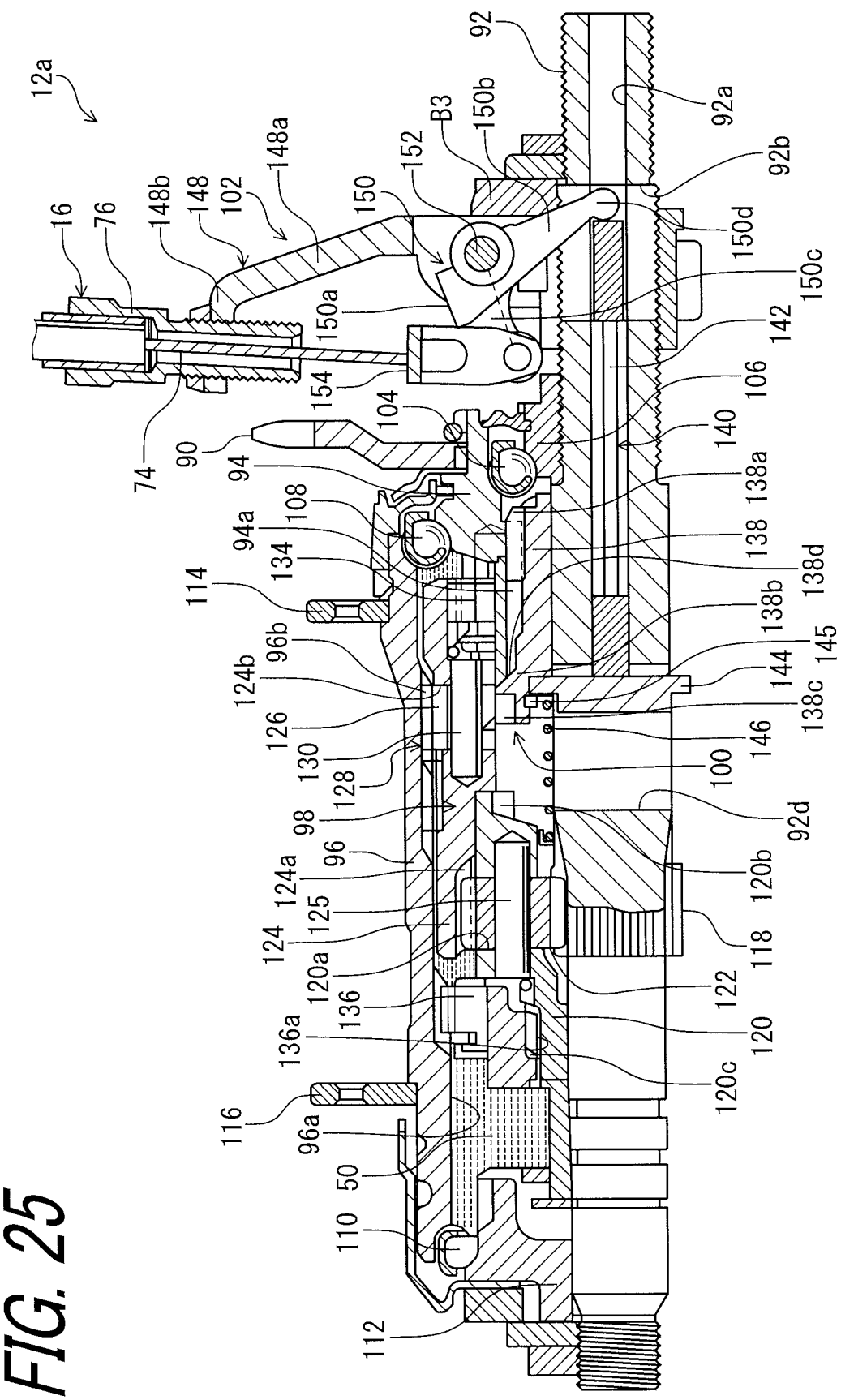
FIG. 25 shows a cross-sectional view of the bicycle internal transmission device in accordance with the second embodiment.

As seen in FIG. 25, the bicycle internal transmission device 12*a* is mounted to the bicycle frame B3. The bicycle internal transmission device 12*a* is configured to transmit the pedaling force to the rear wheel B62 at a variable speed stage. The variable speed stage includes speed stages different from each other. The bicycle internal transmission device 12*a* can have at least two speed stages. In this embodiment, the bicycle internal transmission device 12*a* has three speed stages.

As shown in FIG. 25, the bicycle internal transmission device 12*a* has a hub axle 92 attached to the bicycle frame B3, a driver 94 disposed around the outer periphery at one end of the hub axle 92, a hub shell 96 disposed further around the outer periphery of the hub axle 92 and the driver 94, a planetary gear mechanism 98, an operation mechanism 100 for selecting a power transmission path, and a bell crank 102 for actuating the operation mechanism 100.

The hub axle 92 is a rod-like member which has a larger diameter in its middle and a smaller diameter at both ends. Threads are formed at both ends of hub axle 92. An operation hole 92*a* is formed in the axial portion of the hub axle 92 from the right end to the center in FIG. 25. A first through-groove 92*b* extends through the hub axle 92 across its entire diameter. An action arm 150*b* and a circular strike component 150*d* of a link member 150, which is described below, passes through the first through-groove 92*b*. A second through-groove 92*d* is formed between the planetary gear mechanism 98 and the first through-groove 92*b* in the axial direction of the hub axle 92.

One end of the driver 94 is rotatably supported on the hub axle 92 via balls 104 and a hub cone 106, and the rear sprocket 90 is connected around the outer periphery of driver 94 at the one end. A plurality of serration inner teeth 94*a* are formed in the axial direction around the inner periphery at the other end of the driver 94. The hub shell (an outer member) 96 is a tubular member, and a housing space (an internal space) 96*a* around the inner periphery thereof houses the driver 94, the planetary gear mechanism 98, and the lubricant agent 50. The hub shell 96 is able to rotate around the hub axle 92 via balls 108 and 110 and a hub cone 112. Flanges 114 and 116 for supporting the rear wheel B62 (see FIG. 24) are fixed at both ends of the outer periphery of the hub shell 96.

Figure 26:
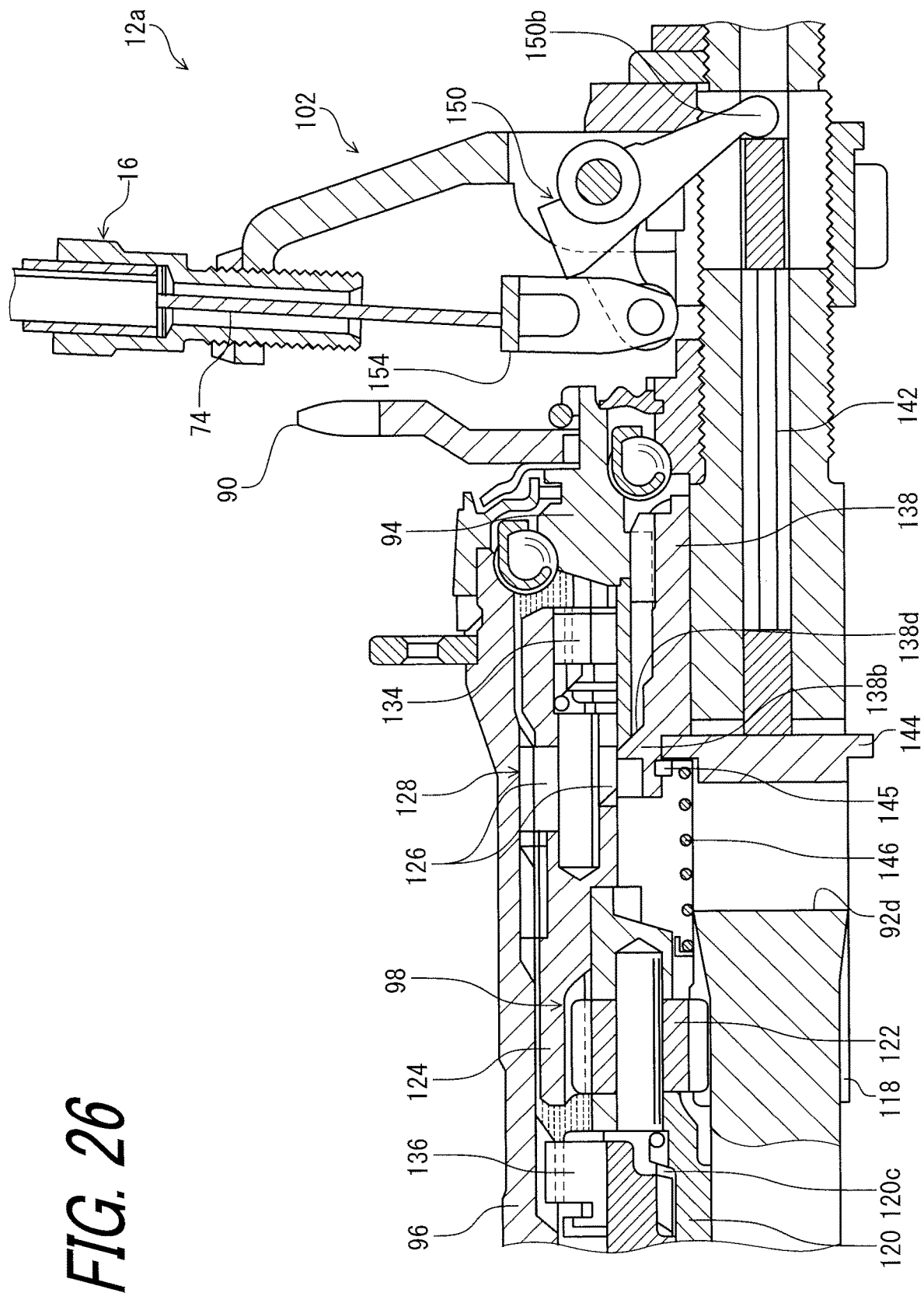
FIG. 26 is an enlarged cross-sectional view of the bicycle internal transmission device of FIG. 25 in a downshift position.

The planetary gear mechanism 98 has a sun gear 118 formed coaxially and integrally with the hub axle 92, a gear frame 120 disposed around the outer periphery of the hub axle 92, three planetary gears 122 (only one planetary gear is shown in the figure) that engage with the sun gear 118, and a ring gear 124. That is, the bicycle internal transmission device 12*a* further comprises the planetary gear mechanism 98 including at least one planetary gear 122, at least one sun gear 118, and at least one ring gear 124. The gear frame 120 is a tubular member, and it is rotatably supported on the hub axle 92. Three notches 120*a* are fainted in the circumferential direction in the gear frame 120, and the planetary gears 122 are rotatably supported by pins 125 in these various notches 120*a*. Serration inner teeth 120*b* are formed around the inner periphery at one end of the gear frame 120, and serration outer teeth 120*c* (a detailed position of the serration outer teeth 120*c* is shown in FIG. 26) is are formed around the outer periphery at the other end.

Figure 27:
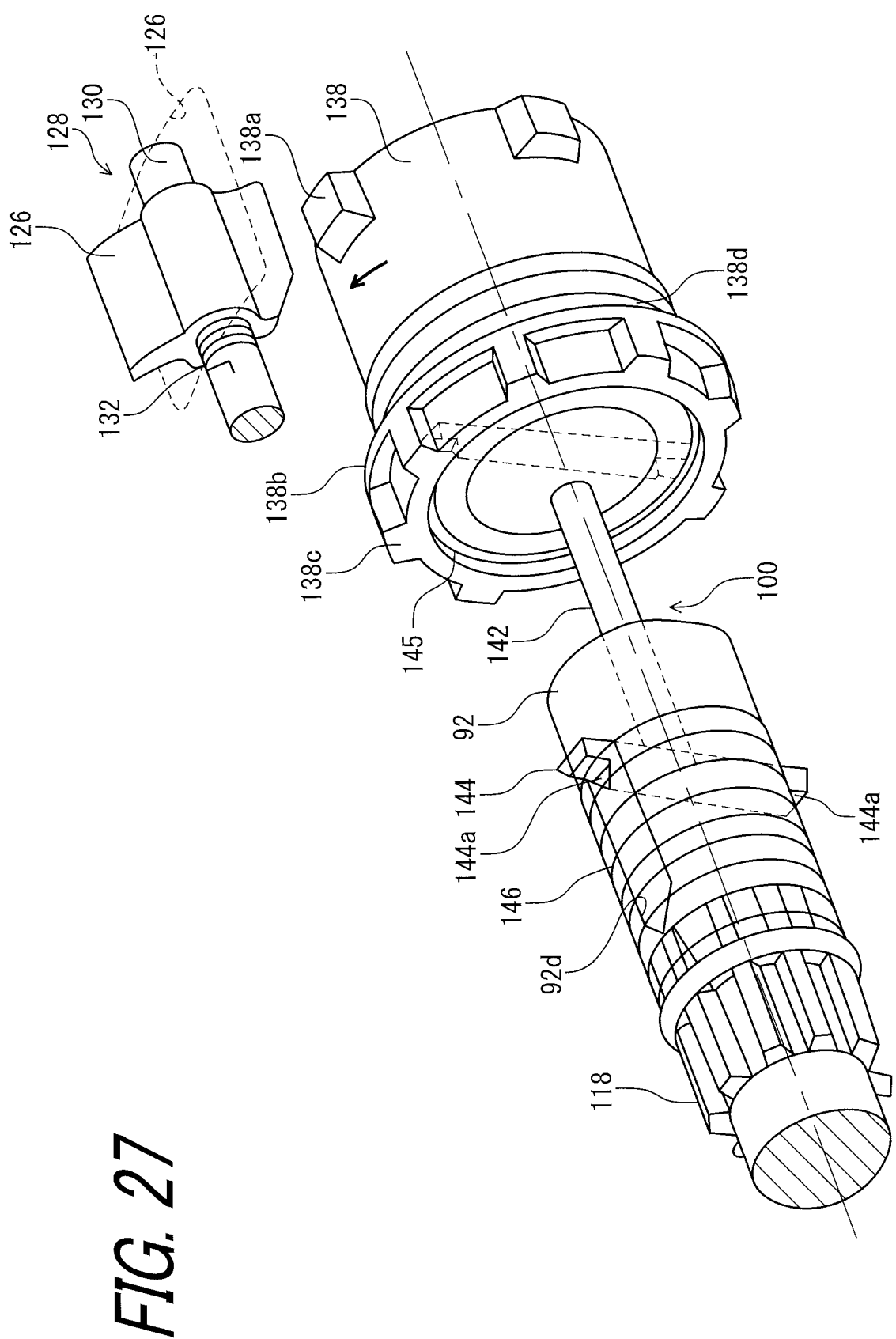
FIG. 27 is an oblique view of an operation mechanism used in the bicycle internal transmission device shown in FIG. 25.

The ring gear 124 is formed in a nearly cylindrical shape, and it extends from the planetary gears 122 to the outer periphery of the driver 94. Inner teeth 124*a* are formed around the inner periphery at one end of the ring gear 124. The planetary gears 122 engage with the sun gear 118 as well as the inner teeth 124*a* of the ring gear 124. A notch 124*b* is formed at the other end of the ring gear 124. As seen in FIG. 27, a clutch pawl 126 that makes up part of a first one-way clutch 128 is swingably supported by a pin 130 in the notch 124*b*. The clutch pawl 126 is biased in the standing direction by a torsion coil spring 132 (FIG. 27). The first one-way clutch 128 transmits rotational drive force only in the forward direction from the ring gear 124 to the hub shell 96. The clutch pawl 126 engages with the ratchet teeth 96*b* formed on the inner peripheral surface of the hub shell 96 only when the ring gear 124 has rotated in the forward direction. When the ring gear 124 rotates in the forward direction, this first one-way clutch 128 is able to switch between a power transmission state in which the clutch pawl 126 engages with the ratchet teeth 96*b* and a transmission cutoff state of retraction from the ratchet teeth 96*b*, which is accomplished by the movement of a clutch member 138 as discussed below.

A second one-way clutch 134 that transmits rotational drive force only in the forward direction from the driver 94 to the ring gear 124 is arranged between the driver 94 and the ring gear 124. A third one-way clutch 136 that transmits rotational drive force only in the forward direction from the gear frame 120 to the hub shell 96 is arranged between the gear frame 120 and the hub shell 96. The third one-way clutch 136 has serration inner teeth 136*a* around the inner periphery at one end. These serration inner teeth 136*a* engage with the serration outer teeth 120*c* of the gear frame 120, and the third one-way clutch 136 rotates integrally with the gear frame 120. These two one-way clutches 134 and 136 are unable to perform switching in a transmission enabled state, unlike the first one-way clutch 128.

The operation mechanism 100 is used to select the power transmission path, and it comprises a clutch member 138 and a clutch control component 140. The clutch member 138 switches the driver 94 and gear frame 120 between a linked state and a separated state, and it also switches the first one-way clutch 128 between a power transmission state and a power cutoff state. The clutch member 138 is positioned around the outer periphery of the hub axle 92 such that it can rotate and move in the axial direction.

As shown in FIG. 27, the clutch member 138 is a tubular member, and it has serration outer teeth 138*a* formed around the outer periphery at one end thereof. The serration outer teeth 138*a* slidably engages with the serration inner teeth 94*a* of driver 94. A large diameter component 138*b* is formed at the other end of the clutch member 138, and serration outer teeth 138*c* are formed around the outer periphery thereof. The serration outer teeth 138*c* are engageable with the serration inner teeth 120*b* formed on the gear frame 120. A taper surface 138*d* is formed between the large diameter component 138*b* and the serration outer teeth 138*c*. This taper surface 138*d* is provided to lower the clutch pawl 126 of the first one-way clutch 128 from its erected position (power transmission position) indicated by the solid line to its retracted position (power cutoff position) indicated by the dotted line. When the clutch member 138 moves from the left to the downshift position on the right end, as seen in FIG. 26, the clutch pawl 126 follows along the taper surface 138d, rides up onto the large diameter component 138b, and is lowered into a retracted attitude.

The clutch control component 140 is configured to move the clutch member 138 in the axial direction of the hub axle 92. The clutch control component 140 has a push rod 142 to move in the axial direction through the operation hole 92a and a shift key 144 to be pressed toward the gear frame 120 by the push rod 142. As shown in FIG. 27, the shift key 144 is a rod-like member with a triangular cross section. When pressed, shift key 144 moves through the second through-groove 92d. In this embodiment, the movement of the shift key 144 is restricted to being within the clutch member 138 by a stop ring 145 mounted around the inner periphery at the other end of the clutch member 138. Therefore, the shift key 144 cannot actually come out of the clutch member 138 as shown in FIG. 27. Instead, the shift key 144 contacts the stop ring 145 and moves the clutch member 138 to the left in FIGS. 25 and 26.

As seen in FIG. 27, a notch 144a is formed at both ends of the shift key 144, and a coil spring 146 is latched on the notch 144a. The coil spring 146 is also latched at its other end on the hub axle 92. The shift key 144 is constantly biased toward the clutch member 138 by the coil spring 146.

The bell crank 102 is mounted to the inside of the bicycle frame B3 in a state in which the hub axle 92 is mounted on the bicycle frame B3, as shown in FIG. 25. The bell crank 102 comprises a support bracket 148 mounted on the hub axle 92 and a link member 150 swingably supported by the support bracket 148. Since the support bracket 148 is mounted on the hub axle 92, it cannot rotate and cannot move in the axial direction. The support bracket 148 has a support component 148a that rotatably supports the link member 150, and a stop component 148b that stops the outer casing 76 of the control cable 16 at the distal end.

The link member 150 is a sheet-form member that has been folded into a cross sectional groove shape. The link member 150 has a bottom component 150a, an action arm 150b that extends from one end of the bottom component 150a toward the hub axle 92, and an inner cable stop arm 150c that extends from the other end of the bottom component 150a toward the hub axle 92 in the direction perpendicular to the action arm 150b. The link shaft 152 is disposed along this bottom component 150a, and the link shaft 152 is mounted to the support component 148a of the support bracket 148 through the base ends of the action arm 150b and the inner cable stop arm 150c. A circular strike component 150d is formed at the distal end of the action arm 150b, and the circular strike component 150d contacts the rear end of the push rod 142. A cable hanger 154 is rotatably mounted to the distal end of the inner cable stop arm 150c. The inner wire 74 of the control cable 16 is connected to the cable hanger 154. When the inner wire 74 is pulled by the shift operating device 14, the link member 150 swings and a shift is performed.

The shift is performed by operating the push rod 142 with the bell crank 102 via the control cable 16. In the state shown in FIG. 26, in which the push rod 142 is not pushed in, the clutch member 138 is disposed in the downshift position at the right end, and the rotation from the driver 94 is transmitted to the hub shell 96 after being reduced in speed via the downshift power transmission path. More specifically, the rotation input to the driver 94 from the rear sprocket 90 is transmitted to the ring gear 124 via the second one-way clutch 134. At this point, the clutch pawl 126 of the first one-way clutch 128 is rotated by the clutch member 138 to the retracted attitude shown by the dotted line in FIG. 27, and the first one-way clutch 128 is in the transmission cutoff state. Accordingly, the rotation transmitted to the ring gear 124 is further transmitted to the hub shell 96 via the planetary gear mechanism 98, the gear frame 120, and the third one-way clutch 136. In this case, the input rotation is reduced in speed according to the gear shift ratio determined by the numbers of teeth of the sun gear 118, the planetary gears 122, and the ring gear 124.

If the shift operating device 14 is operated, the link member 150 of the bell crank 102 swings and pushes in the push rod 142 by one stage. As a result, the shift key 144 is pushed by the push rod 142 against the spring force of the coil spring 146, guided into the second through-groove 92d, and moved to the left in FIG. 26. The clutch member 138 is also pushed via the stop ring 145 and assumes a direct drive position. Once the clutch member 138 is disposed in the direct drive position shown in FIG. 28, the clutch pawl 126 of the first one-way clutch 128, which had been put into a retracted attitude by the taper surface 138d, is returned to the erected attitude shown by the solid line in FIG. 27 by the spring force of the torsion coil spring 132. In this state, the first one-way clutch 128 is able to transmit rotation only in the forward direction from the ring gear 124 to the hub shell 96. Therefore, the rotation from the driver 94 is directly transmitted to the hub shell 96 through the direct drive power transmission path. More specifically, the rotation input to the driver 94 from the rear sprocket 90 is transmitted to the ring gear 124 via the second one-way clutch 134, then is transmitted to the hub shell 96 via the first one-way clutch 128. That is, the rotation of the driver 94 is transmitted directly to the hub shell 96 via the ring gear 124. At this point, the rotation is transmitted from the ring gear 124 to the gear frame 120 via the planetary gear mechanism 98, and the gear frame 120 rotates at reduced speed, but since the rotation of the hub shell 96 is faster than that of the gear frame 120, there is no transmission of the rotation from the gear frame 120 to the hub shell 96 via the third one-way clutch 136.

When the shift operating device 14 is further operated from the direct drive state and the push rod 142 is pushed in further, the shift key 144 moves further to the left, and the clutch member 138 also moves correspondingly to the upshift position. When the clutch member 138 is disposed in the upshift position shown in FIG. 29, the serration outer teeth 138c of the clutch member 138 and the serration inner teeth 120b of the gear frame 120 engage with each other. In this movement to the upshift position, when the serration outer teeth 138c and the serration inner teeth 120b are disposed in the positions where they engage, the clutch member 138 moves directly to the upshift position to the left after the clutch member 138 strikes the gear frame 120. In this state, the rotation transmitted to the driver 94 from the rear sprocket 90 is transmitted to the hub shell 96 via the upshift transmission path. More specifically, rotation is transmitted from the driver 94 to the clutch member 138 via the serration inner teeth 94a and the serration outer teeth 138a, and rotation is transmitted from the clutch member 138 to the gear frame 120 via the serration outer teeth 138c and the serration inner teeth 120b. The rotation transmitted to the gear frame 120 is transmitted to the hub shell 96 via the planetary gear mechanism 98, the ring gear 124, and the first one-way clutch 128. In this case, the input rotation is increased in speed and output according to the gear shift ratio determined by the numbers of teeth of the sun gear 118, the planetary gears 122, and the ring gear 124. There is an attempt at this point to transmit the rotation from the driver 94 toward the ring gear 124 via the second one-way clutch 134, but since the rotation of the ring gear 124 is faster than that of the driver 94, no rotation is transmitted from the second one-way clutch 134.

Figure 28:
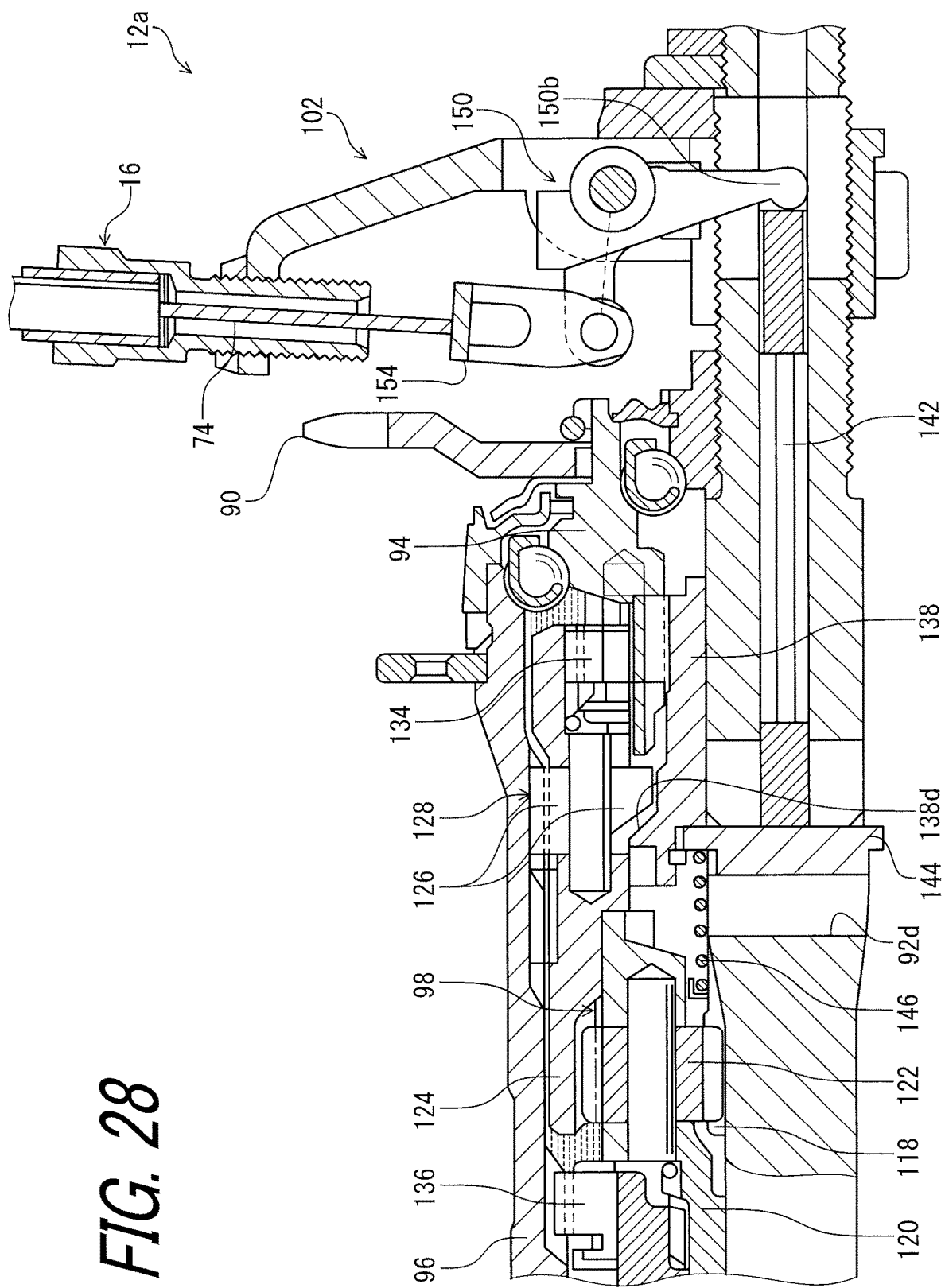
FIG. 28 is an enlarged cross-sectional view of the bicycle internal transmission device of FIG. 25 in a direct drive position.
Figure 29:
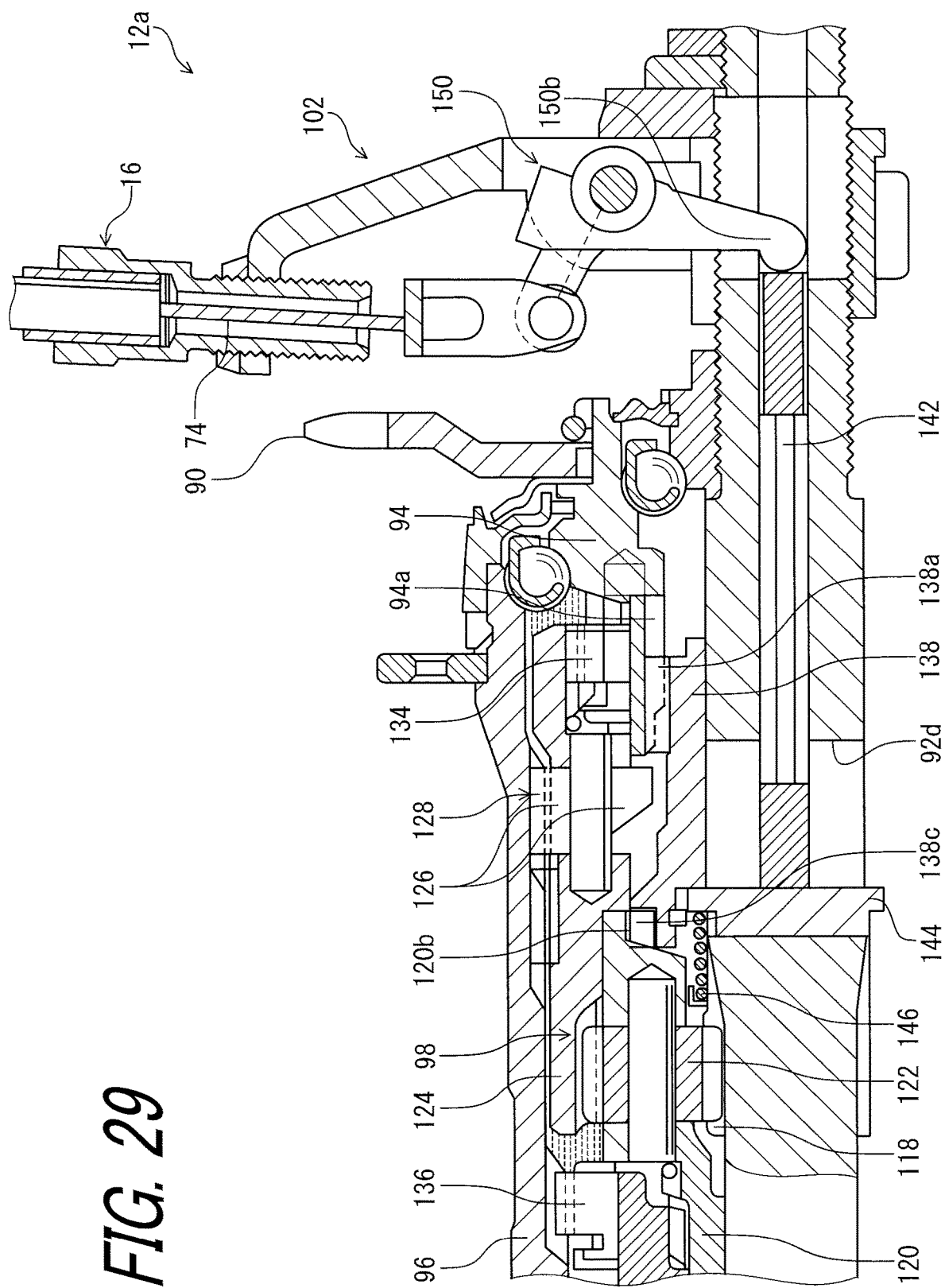
FIG. 29 is an enlarged cross-sectional view of the bicycle internal transmission device of FIG. 25 in an upshift position.

When a release lever of the shift operating device 14 is operated at the upshift position shown in FIG. 29 or at the direct drive position shown in FIG. 28, the coil spring 146 presses on the shift key 144 and causes the push rod 142 to retract by one stage to the right. The shift key 144 then presses on the clutch member 138 to move the clutch member 138 to the direct drive position or the downshift position.

Figure 30:
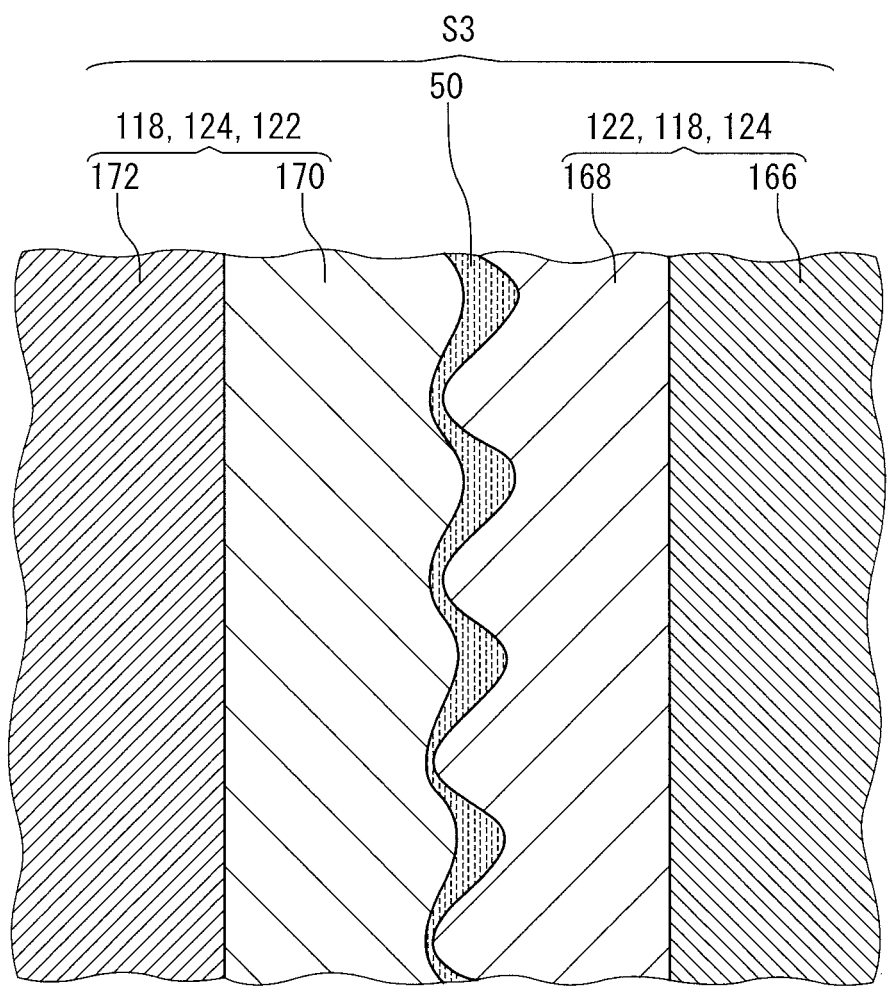
FIG. 30 is an enlarged exemplary view of a sliding component in accordance with the second embodiment.

In this embodiment, as seen in FIG. 30, at least one of the at least one planetary gear 122, the at least one sun gear 118, and the at least one ring gear 124 includes a base member 166 and a plated layer 168. At least one of the at least one sun gear 118, the at least one ring gear 124, and the at least one planetary gear 122 includes a chromized layer 170 and an additional base member 172. The base member 166, the plated layer 168, the chromized layer 170, and the lubricant agent 50 constitute a sliding component S3. The base member 166, the plated layer 168, the chromized layer 170, the additional base member 172 has substantially the same structure as that of the base member 66, the plated layer 68, the chromized layer 70, the additional base member 72, respectively, which are described in the first embodiment. Accordingly, the detailed structure and function of the base member 166, the plated layer 168, the chromized layer 170, the additional base member 172 will not be described and/or illustrated again in detail here for the sake of brevity.

In this embodiment, more specifically, in a case where the at least one planetary gear 122 includes the base member 166 and the plated layer 168, at least one of the at least one sun gear 118 and the at least one ring gear 124 includes the chromized layer 170 and the additional base member 172. In this case, preferably, both the at least one sun gear 118 and the at least one ring gear 124 include the chromized layer 170 and the additional base member 172. Further, in a case where at least one of the at least one sun gear 118 and the at least one ring gear 124 includes the base member 166 and the plated layer 168, the at least one planetary gear 122 includes the chromized layer 170 and the additional base member 172. In this case, preferably, both the at least one sun gear 118 and the at least one ring gear 124 include the base member 166 and the plated layer 168, and the at least one planetary gear 122 includes the chromized layer 170 and the additional base member 172.

Since the at least one planetary gear 122, the at least one sun gear 118, and the at least one ring gear 124 is a gear in the bicycle internal transmission device 12*a*, the sliding component S3 further comprises the gear 118, 122, or 124 including the base member 166 and the plated layer 168. The gear 118, 122 or 124 is a part of the bicycle drive train 13.

In the second embodiment, the sliding component S3 is provided in the planetary gear mechanism 98 in which each of the at least one planetary gear 122 always engages with the at least one sun gear 118 and the at least one ring gear 124. Accordingly, a friction coefficient between two adjacent gears of these gears affects a performance of the bicycle internal transmission device 12*a*. The sliding component S3 has the same feature as that of the sliding components S1 and S2. That is, the sliding component S3 decreases a friction coefficient between the plated layer 168 and the chromized layer 170, and the friction coefficient tends not to be increased after a long time of use. Therefore, the sliding component S3 significantly enhances the performance of the bicycle internal transmission device 12*a*.

Further, similarly to the sliding components S1 and S2, in the sliding component S3, the chromized layer 170 and the plated layer 168 are resistant to agglutination, and it is less possible for the plated layer 168 to directly contact the chromized layer 170. Accordingly, duration of the bicycle internal transmission device 12*a* is enhanced.

In the above description, the sliding component S3 is provided in the planetary gear mechanism 98. However, the sliding component S3 can be provided in at least one of one-way clutches 128, 134, and 136. In addition, the sliding component S3 can be provided at least one of between the serration inner teeth 94*a* and the serration outer teeth 138*a*, between the clutch pawl 126 and the ratchet teeth 96*b*, between the serration outer teeth 138*c* and the serration inner teeth 120*b*, between the serration inner teeth 136*a* and the serration outer teeth 120*c*, between the hub axle 92 and the clutch member 138, between the bicycle chain 44 and each of the front sprocket and the rear sprocket 90. In such case, the sliding component S3 significantly enhances performance and duration of the bicycle internal transmission device 12*a* or the bicycle drive train 13.

Modifications of First and Second Embodiments

In the above embodiment, the sliding components S1, S2, and S3 comprise the chromized layers 70, 88, and 170, respectively. However, the chromized layer 70, 88, and 170 can be omitted from the sliding components S1, S2, and S3, respectively. In such case, if the additional base member 172 is made of metallic material including iron, the additional base member 172 and the plated layer 168 are resistant to agglutination. Further, chromized layers 70, 88, and 170 can be a metallic layer made of a different material from chrome. If such metallic layer includes iron, such metallic layer and the plated layer 168 are resistant to agglutination.

The sliding component S3 can be applied to a different gear mechanism such as a fishing reel. Even in such case, the sliding component S3 further comprises a gear including the base member 166 and the plated layer 168.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle component comprising:
   an outer member enclosing an internal space in which a lubricant agent including a fatty acid containing a carboxyl group is stored, the outer member being sealed so as to keep the lubricant agent in the internal space; and
   a sliding component disposed within the internal space, the sliding component including:
     a base member; and
     a plated layer including a metallic material, the plated layer being disposed on the base member, the lubricant agent contacting the plated layer.

2. The bicycle component according to claim 1, wherein the fatty acid includes an olein acid.

3. The bicycle component according to claim 1, wherein the fatty acid includes a stearic acid.

4. The bicycle component according to claim 1, wherein the fatty acid includes a linoleic acid.

5. The bicycle component according to claim 1, wherein the plated layer has Vickers hardness ranging from 10 HV to 200 HV.

6. The bicycle component according to claim 1, wherein the plated layer includes tin.

7. The bicycle component according to claim 6, wherein the sliding component includes
   a chromized layer to slidably contact the plated layer.

8. A bicycle component comprising:
   an outer member having an internal space; and
   a sliding component disposed within the internal space, the sliding component including:
     a base member;
     a plated layer including a metallic material, the plated layer being disposed on the base member; and
     a lubricant agent including a fatty acid containing a carboxyl group, the lubricant agent contacting the plated layer, wherein
   the plated layer includes silver.

9. The bicycle component according to claim 8, wherein the sliding component includes
   a chromized layer to slidably contact the plated layer.

10. The bicycle component according to claim 1, further comprising:
    a bicycle chain disposed within the internal space and including the base member and the plated layer.

11. The bicycle component according to claim 10, wherein
    the bicycle chain includes an inner link plate and an outer link plate, and
    at least one of the inner link plate and the outer link plate includes the base member and the plated layer.

12. The bicycle component according to claim 11, wherein
    the bicycle chain includes a pin which is chromized.

13. The bicycle component according to claim 12, wherein
    the inner link plate includes the base member and the plated layer, and
    the pin is configured to slidably contact the inner link plate.

14. The bicycle component according to claim 1, wherein the bicycle component is a Bowden cable.

15. The bicycle component according to claim 14, wherein
    the Bowden cable includes an inner wire disposed within the internal space, and
    the inner wire includes the base member and the plated layer.

16. The bicycle component according to claim 1, further comprising:
    a gear disposed within the internal space and including the base member and the plated layer.

17. The bicycle component according to claim 16, wherein
    the gear is a part of a bicycle drive train.

18. The bicycle component according to claim 1, further comprising:
    a planetary gear mechanism disposed within the internal space and including at least one planetary gear, at least one sun gear, and at least one ring gear, at least one of the at least one planetary gear, the at least one sun gear, and the at least one ring gear including the base member and the plated layer.

19. A sliding component comprising:
    a base member;
    a plated layer including silver, the plated layer being disposed on the base member; and
    a lubricant agent including a fatty acid containing a carboxyl group, the lubricant agent contacting the plated layer.

* * * * *